United States Patent
Chan et al.

(10) Patent No.: US 9,913,092 B2
(45) Date of Patent: Mar. 6, 2018

(54) MITIGATING SIGNAL NOISE FOR FINGERPRINT-BASED INDOOR LOCALIZATION

(71) Applicant: The Hong Kong University of Science and Technology, Kowloon, Hong Kong (CN)

(72) Inventors: Shueng Han Gary Chan, Hong Kong (CN); Suining He, Hong Kong (CN)

(73) Assignee: The Hong Kong University of Science and Technology, Kowloon (HK)

(*) Notice: Subject to any disclaimer, the term of this patent is extended or adjusted under 35 U.S.C. 154(b) by 0 days.

(21) Appl. No.: 15/316,140

(22) PCT Filed: May 29, 2015

(86) PCT No.: PCT/CN2015/080310
§ 371 (c)(1),
(2) Date: Dec. 2, 2016

(87) PCT Pub. No.: WO2015/184961
PCT Pub. Date: Dec. 10, 2015

(65) Prior Publication Data
US 2017/0134899 A1   May 11, 2017

Related U.S. Application Data

(60) Provisional application No. 62/008,883, filed on Jun. 6, 2014.

(51) Int. Cl.
H04W 24/00 (2009.01)
H04W 4/02 (2018.01)
(Continued)

(52) U.S. Cl.
CPC ........... H04W 4/023 (2013.01); G01S 5/0252 (2013.01); H04B 17/318 (2015.01);
(Continued)

(58) Field of Classification Search
None
See application file for complete search history.

(56) References Cited

U.S. PATENT DOCUMENTS 7,983,667 B2 * 7/2011 Hart ................. H04W 16/20
455/423
8,588,097 B1    11/2013 Ogale et al.
(Continued)

FOREIGN PATENT DOCUMENTS

CN    102340868 A    2/2012
CN    103402256 A    11/2013
(Continued)

OTHER PUBLICATIONS

International Search Report for PCT Application No. PCT/CN2015/080310, dated Aug. 21, 2015, 2 pages.
(Continued)

Primary Examiner — Shantell L Heiber
(74) Attorney, Agent, or Firm — Amin, Turocy & Watson, LLP

(57) ABSTRACT

Locating mobile devices based on a junction of signal tiles is disclosed herein. Mobile devices are mapped to a convex hull within which the mobile device is likely to be located in based on a received signal strength indicator (RSSI) associated with an access point (AP). Using the RSSI from a set of APs, the mobile device can be located within a junction of a set of convex hulls, or tiles using a linear programming function. To mitigate signal noise and improve the accuracy of the location determination, the localization system can use the RSSIs of the APs that have signals with a predetermined signal dynamic range that leads to smaller tiles. Additionally, the localization system can reduce the
(Continued)

search complexity of matching fingerprints to APs by partitioning the space into clusters with reference points that have similar signal vectors.

20 Claims, 17 Drawing Sheets

(51) Int. Cl.
    *H04W 64/00*         (2009.01)
    *H04B 17/318*       (2015.01)
    *H04W 24/10*         (2009.01)
    *G01S 5/02*           (2010.01)
    *H04W 84/12*         (2009.01)
    *H04W 88/08*         (2009.01)

(52) U.S. Cl.
    CPC ......... *H04W 24/10* (2013.01); *H04W 64/003* (2013.01); *H04W 84/12* (2013.01); *H04W 88/08* (2013.01)

(56) References Cited

U.S. PATENT DOCUMENTS

| | | | |
|---|---|---|---|
| 2006/0194587 A1* | 8/2006 | Sharony | G01S 5/0252 455/456.1 |
| 2009/0326810 A1* | 12/2009 | Callaghan | G01C 21/26 701/532 |
| 2010/0134356 A1 | 6/2010 | Huang et al. | |
| 2011/0250904 A1 | 10/2011 | Valletta et al. | |
| 2013/0157683 A1 | 6/2013 | Lymberopoulos et al. | |
| 2013/0331113 A1* | 12/2013 | Grosman | G01S 5/0242 455/452.1 |
| 2014/0179352 A1* | 6/2014 | V.M. | H04W 4/043 455/456.2 |
| 2015/0241551 A1* | 8/2015 | Jalali | G06K 7/10009 342/451 |

FOREIGN PATENT DOCUMENTS

| | | |
|---|---|---|
| CN | 103476115 B | 12/2013 |
| CN | 103698740 A | 4/2014 |
| CN | 103874191 A | 6/2014 |
| WO | 2005107094 A1 | 11/2005 |
| WO | 2006012554 A2 | 2/2006 |
| WO | 2009086278 A1 | 7/2009 |
| WO | 2013013307 A1 | 1/2013 |
| WO | 2015184961 | 12/2015 |

OTHER PUBLICATIONS

Wu, et al. "WILL: Wireless Indoor Localization Without Site Survey," Proceedings IEEE INFOCOM, 2012, 9 pages.
Wang, et al., "No Need to War-Drive: Unsupervised Indoor Localization," MobiSys '12, 2012, 14 pages.
Chen, et al., "Indoor Localization Using FM Signals," IEEE Trans. Mobile Computing, 2013, 16 pages.
Wang, et al., "Dude, Where's My Card?, RFID positioning that works with multipath and non-line of sight," Proc. ACM SigComm, 2013, 12 pages.
Liu, et al., "Push the Limit of WiFi Based Localization for Smartphones," Proceedings of the 18th annual international conference on Mobile computing and networking, 2012, 12 pages.
Mirowski, et al., KL-Divergence Kernel Regression for Non-Gaussian Fingerprint, Indoor Positioning and Indoor Navigation (IPIN), 2011 International Conference, 2011, 10 pages.
Bahl, et al., "Radar: An In-Building Re-based User Location and Tracking System," Proc. IEEE Infocom, 2000, 10 pages.
Youssef, et al., "The Horus WLAN Location Determination System," Proc. ACM MobiSys, 2005, 14 pages.
Goswami, et al., "Wigem: A Learning-Based Approach for Indoor Localization," Proc. ACM CoNext, 2011, 12 pages.
Feng, et al. "Compressive Sensing Based Positioning Using RSS of WLAN access points," Proc. Infocom, 2010, 9 pages.
Shen, et al., "Walkie-markie: Indoor Pathway Mapping Made Easy," Proc. USENIX NSDI, 2013, 14 pages.
Xiang, et al., "Hallway Based Automatic Indoor Floorplan Construction Using Room Fingerprints," Proc. UbiComp, 2013, 10 pages.
Rai, et al., "Zee: Zero-Effort Crowdsourcing for Indoor Localization," in Proc. ACM MobiCom, 2012, 12 pages.
Sun, et al., "Moloc: On Distinguishing Fingerprint Twins," in Proc. IEEE ICDCS, 2013, 10 pages.
Jun, et al., "Social-Loc: Improving Indoor Localization with Social Sensing," in Proc. ACM SenSys, 2013, 14 pages.
He, et al., "Sectjunction: Wi-Fi indoor localization based on junction of signal sectors," in IEEE ICC, 2014, 6 pages.
Alsindi, et al., Geolocation Techniques: Principles and Applications. Springer, 2012, 291 pages.
Liu, et al."Survey of Wireless Indoor Positioning Techniques and Systems," IEEE Trans. Systems, Man, and Cybernetics, 2007, 14 pages.
Berg, et al., "Computational Geometry," Springer, 2000.
Boyd, et al., "Convex Optimization," Cambridge University Press, 2004, 730 pages.
Han, et al., "Data Mining: Concepts and Techniques," Morgan Kaufmann, 2012, 740 pages.
Luxburg, "A Tutorial on Spectral Clustering," Statistics and computing, 2007, 29 pages.
Liu et al., "Segmentation of 3D Meshes through Spectral Clustering," 12th Pacific Conference, 2004, 8 pages.
Song, et al., "Parallel spectral clustering" in Machine Learning and Knowledge Discovery in Databases. Springer, 2008, 16 pages.

* cited by examiner

2300 ⟶

```
Algorithm 1: Find the maximum overlapping tiles.
Input:
  T: End list of each intersection points.
  P: List of overlapping pairs corresponding to T.
Output:
  A: set of signal tiles for T-junction.
1  N_c ← 0;                              /* # of overlapping pairs */
2  Max ← 0;
   /* Max # of overlapping pairs */
3  H_c ← ∅;   /* Current overlapping tiles */
4  A ← ∅;    /* Final set of tiles */
5  for i = 0 to T.size() - 1 do
6  |   if T[i] == 0 then
7  |   |   N_c ← N_c + 1;   /* Bol */
8  |   |   H_c ← H_c ∪ P[i];
9  |   else
10 |   |   N_c ← N_c - 1;   /* Eol */
11 |   |   H_c ← H_c \ P[i];
12 |   end
13 |   Max ← maxiMax, N_c;
14 |   if sizeof(H_c) > sizeof(A) then
15 |   |   A ← H_c;
16 |   end
17 end
```

```
Algorithm 2: Pseudocode for RP Clustering.
  Input:
  {q_n}: set of RSSI vectors at all RPs;
  K: number of clusters to be constructed;
  Output:
  {C_m}: Index of RPs in each cluster m.
  /* Calculate the pairwise Cosine similarity between the RPs.        */
1 for i ← 1 to N do
2 |   for j ← 1 to i do
3 |   |   S[i,j] ← sim(q_i, q_j);
  |   |   /* Cosine similarity.                                        */
4 |   |   S[j,i] ← S[i,j];
5 |   end
6 end
7 Diag ← diag(sum(S));
  /* Construct a symmetric matrix where each diagonal element corresponds to sum of
     each column of S.                                                 */
8 DS ← Diag − S;
9 Vec ← eigs(DS, Diag, K);
  /* Eigenvector of DS.                                                */
10 return {C_m} ← Kmeans(Vec, K);
  /* K-means clustering algorithm.                                     */
```

FIG. 25

MITIGATING SIGNAL NOISE FOR FINGERPRINT-BASED INDOOR LOCALIZATION

CROSS REFERENCE TO RELATED APPLICATIONS

This application is a U.S. National Stage patent application filing under 35 USC § 371 of international Patent Cooperation Treaty (PCT) Application No. PCT/CN2015/080310, filed on May 29, 2015, and entitled "MITIGATING SIGNAL NOISE FOR FINGERPRINT-BASED INDOOR LOCALIZATION," which claims priority to U.S. Provisional Application No. 62/008,883, filed on Jun. 6, 2014, entitled: "Tile Junction: Indoor Localization based on Junction of Signal Tiles." The entireties of both of which applications are hereby incorporated herein by reference.

TECHNICAL FIELD

This disclosure generally relates to indoor localization of mobile devices using Wi-Fi access points and mitigating signal noise to improve location accuracy and related embodiments.

BACKGROUND

In indoor localization based on Wi-Fi fingerprinting, a target sends its received signal strength indicator (RSSI) of access points (APs) to a server to estimate the position of the target. Traditionally, the server estimates the target position by matching the RSSI with fingerprints stored in a database. Due to signal noise in fingerprint and target measurements, this often results in a geographically disperse set of reference points (RPs), leading to location estimation inaccuracy.

The above-described background is merely intended to provide an overview of contextual information regarding networks, and is not intended to be exhaustive. Additional context may become apparent upon review of one or more of the various non-limiting embodiments of the following detailed description.

BRIEF DESCRIPTION OF THE DRAWINGS

Numerous aspects and embodiments are set forth in the following detailed description, taken in conjunction with the accompanying drawings, in which like reference characters refer to like parts throughout, and in which:

FIG. 23 depicts an exemplary, non-limiting algorithm for finding an area with maximum overlapping tiles according to an aspect or embodiment of the subject disclosure;

FIG. 25 depicts an exemplary, non-limiting algorithm for RP clustering using spectral clustering according to an aspect or embodiment of the subject disclosure;

DETAILED DESCRIPTION

Figure 1:
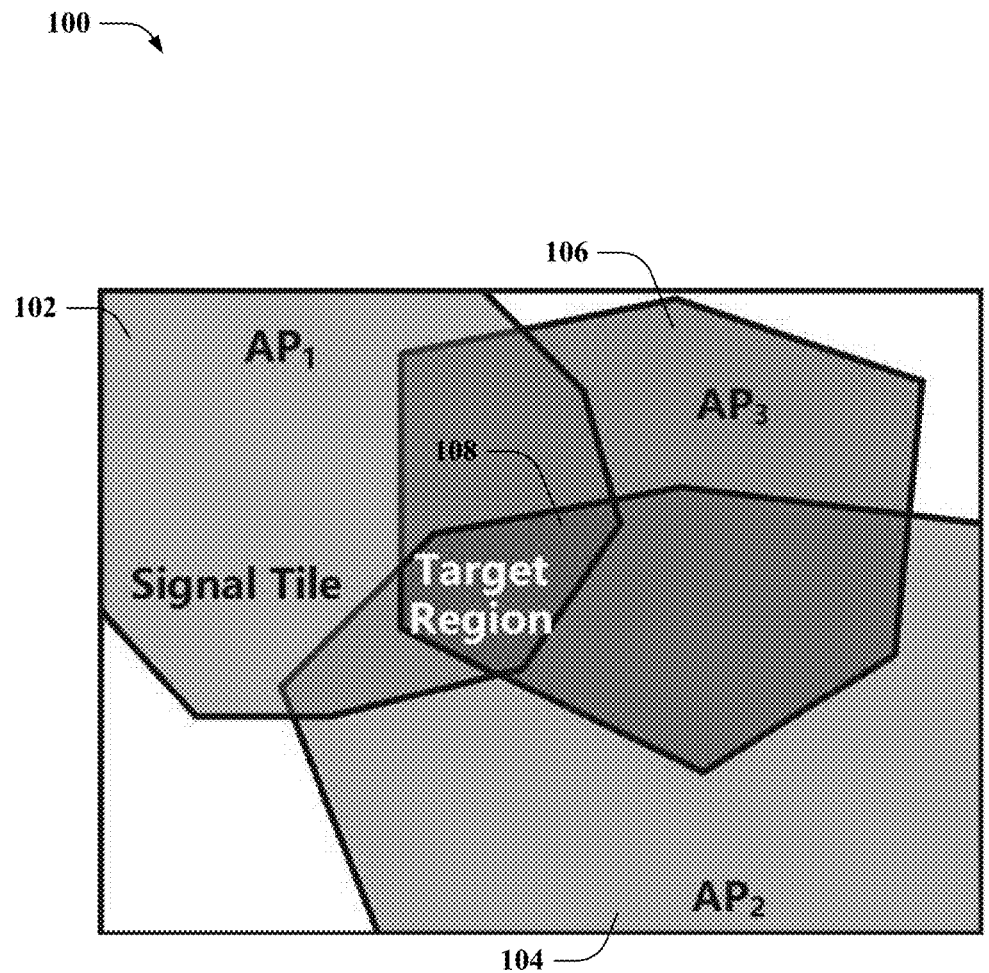
FIG. 1 is an example non-limiting schematic diagram of overlapping tiles according to an aspect or embodiment of the subject disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that the certain aspects of disclosure may be practiced without these specific details, or with other methods, components, molecules, etc. In other instances, well-known structures and devices are shown in block diagram form to facilitate description and illustration of the various embodiments. Additionally, elements in the drawing figures are not necessarily drawn to scale; some areas or elements may be expanded to help improve understanding of certain aspects or embodiments.

The terms "access point," "server," "base server," (BS) and the like, are utilized interchangeably in the subject application, and refer to a network component or appliance that serves and receives data, control, voice, video, sound, gaming, or substantially any data-stream or signaling-stream from a set of subscriber stations. Data and signaling streams can be packetized or frame-based flows. Furthermore, the terms "user," "subscriber," "customer," "consumer," and the like are employed interchangeably throughout the subject specification, unless context warrants particular distinction(s) among the terms. It should be noted that such terms can refer to human entities or automated components supported through artificial intelligence (e.g., a capacity to make inferences based on complex mathematical formalisms), which can provide simulated vision, sound recognition and so forth.

It is noted that, terms "user equipment," "device," "user equipment device," "client," and the like are utilized interchangeably in the subject application, unless context warrants particular distinction(s) among the terms. Such terms can refer to network component(s) or appliance(s) that servers and receives data, voice, video, sound, games, or substantially any data-stream or signaling-stream to or from network components and/or other devices. By way of example, a user equipment device and the like, as used herein and throughout this disclosure, can comprise a mobile device such as an electronic device capable of wirelessly sending and receiving data. A user equipment device may have a processor, a memory, a transceiver, an input, and an output. Examples of such devices include cellular telephones, personal digital assistants, portable computers, tablet computers, handheld gaming consoles, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

Furthermore, the terms "real-time," "near real-time," "dynamically," "instantaneous," "continuously," and the like are employed interchangeably or similarly throughout the subject specification, unless context warrants particular distinction(s) among the terms. It should be noted that such terms can refer to data which is collected and processed at an order without perceivable delay for a given context, the timeliness of data or information that has been delayed only by the time required for electronic communication, actual or near actual time during which a process or event occur, and temporally present conditions as measured by real-time software, real-time systems, and/or high-performance computing systems. Real-time software and/or performance can be employed via synchronous or non-synchronous programming languages, real-time operating systems, and real-time networks, each of which provide frameworks on which to build a real-time software application. A real-time system may be one where its application can be considered (within context) to be a main priority. In a real-time process, the analyzed (input) and generated (output) samples can be processed (or generated) continuously at the same time (or near the same time) it takes to input and output the same set of samples independent of any processing delay.

Aspects or features of the subject specification can be exploited in substantially any radio access network employing respective radio access technologies, e.g., Wi-Fi, global system for mobile communications, universal mobile telecommunications system, worldwide interoperability for microwave access, enhanced general packet radio service, third generation partnership project long term evolution, fourth generation long term evolution, third generation partnership project 2, ultra mobile broadband, high speed packet access, Zigbee, $x^{th}$ generation, long term evolution, or another IEEE 802.XX technology. Additionally, substantially all aspects of the subject specification can be exploited in legacy telecommunication technologies.

The systems and methods disclosed herein, in one aspect thereof, can accurately locate mobile device targets by mapping the mobile device to a convex hull within which the mobile device is likely to be located in based on a received signal strength indicator (RSSI) associated with an access point (AP). Using the RSSI from a set of APs, the mobile device can be located within a junction of a set of convex hulls, or tiles using a linear programming function. To mitigate signal noise and improve the accuracy of the location determination, the localization system can use the RSSIs of the APs that have signals with a predetermined signal dynamic range that leads to smaller tiles. Additionally, the localization system can reduce the search complexity of matching fingerprints to APs by partitioning the space into clusters with reference points that have similar signal vectors.

The localization system disclosed herein confines the target estimation based on the reference point clustering and the signal regions. Based on these constraints, the localization system can confine the target to a region called a "tile" for each of its received AP RSSI. The mobile device can then be located based on the overlap region of all these tiles. APs with large signal dynamic range in the whole site are preferred as they result in smaller signal tiles. During on offline phase, or during a preprocessing process, the APs with low or narrow dynamic range can be filtered out by making use of signal entropy. Using the filtered APs, the tiles are then calculated based on discrete signal levels with their Wi-Fi peaks as the centers.

The search space in fingerprint database can be large, consisting of large quantities of reference points (RPs). To narrow the search space for computational efficiency, the localization system can partition the site into clusters consisting of similar signal vectors using a k-means algorithm. To efficiently identify the cluster where the target is, the localization system elects some exemplar RPs in each cluster to represent each cluster. Given a target vector, the localization system then maps it to one of the clusters using these exemplars. The clusters can serve as a constraint in the localization process by reducing the computational load in matching fingerprints to APs. Based on the approaches above, given a target RSSI, the localization system first computes the tiles and determines the cluster where the target is in. Using a signal difference metric comparing signals with a measurement uncertainty, the localization system can then localize the target by formulating a linear programming-based optimization problem to maximize fingerprint matching given the target's tiles and cluster.

"Logic" as used herein and throughout this disclosure, refers to any information having the form of instruction signals and/or data that may be applied to direct the operation of a processor. Logic may be formed from signals stored in a memory device. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

It is noted that user equipment devices can communicate with each other and with other elements via a network, for instance, a wireless network, or a wireline network. A "network" can include broadband wide-area networks such as cellular networks, local-area networks, wireless local-area networks (e.g., Wi-Fi), and personal area networks, such as near-field communication networks including BLUETOOTH®. Communication across a network is preferably packet-based; however, radio and frequency/amplitude modulations networks can enable communication between communication devices using appropriate analog-digital-analog converters and other elements. Communication is enabled by hardware elements called "transceivers." User equipment devices can have more than one transceiver, capable of communicating over different networks. For example, a cellular telephone can include a cellular transceiver for communicating with a cellular base station, a Wi-Fi transceiver for communicating with a Wi-Fi network, and a BLUETOOTH® transceiver for communicating with a BLUETOOTH® device. A Wi-Fi network is accessible via "access points" such as wireless routers, etc., that communicate with the Wi-Fi transceiver to send and receive data. The Wi-Fi network can further be connected to the internet or other packet-based networks. The "bandwidth" of a network connection or an access point is a measure of the rate of data transfer, and can be expressed as a quantity of data transferred per unit of time. Additionally, communication (e.g., voice and/or data traffic) between one or more components can include, wired communications (routed through a backhaul broadband wired network, an optical fiber backbone, twisted-pair line, T1/E1 phone line, digital subscriber line, coaxial cable, and/or the like), and or radio broadcasts (e.g., cellular channels, Wi-Fi channels, satellite channels, and/or the like).

A network, as used herein, typically includes a plurality of elements that host logic for performing tasks on the network. The logic can be hosted on servers. In modern packet-based wide-area networks, servers may be placed at several logical points on the network. Servers may further be in communication with databases and can enable communication devices to access the contents of a database. Billing servers, application servers, etc. are examples of such servers. A server can include several network elements, including other servers, and can be logically situation anywhere on a service provider's network, such as the back-end of a cellular network.

Various embodiments disclosed herein include a system that has a processor and a memory that stores executable instructions, that when executed by the processor facilitate performance of operations. The operations include receiving a first wireless signal report from a mobile device, wherein the first wireless signal report comprises a first received signal strength indication for a first access point. The operations also include determining a first tile in which the mobile device is located, wherein the first tile is a convex hull representing a set of candidate locations at which the first received signal strength indication for the first access point indicates that the mobile device is capable of being. The operations also include determining a second tile in which the mobile device is located based on a second wireless signal report comprising a second received signal strength indication for a second access point and determining an area in which the mobile device is located, wherein the area is an overlapping area between the first tile and the second tile.

In another embodiment, a method includes receiving, by a system comprising a processing device, a first wireless measurement report from a mobile device, wherein the first wireless measurement report comprises a first received signal strength measurement and a first signal vector for a first access point device. The method further includes determining, by the system, a first convex hull representing a first set of locations in which the mobile device is located based on the first wireless measurement report and determining, by the system, a second convex hull representing a second set of locations in which the mobile device is located based on a second wireless measurement report received from the mobile device. The method additionally includes determining, by the system, an area in which the mobile device is located based on determining overlapping portions of the first convex hull and the second convex hull.

In another embodiment, a computer-readable storage device storing computer-executable instructions that, in response to execution, cause a system comprising a processor to perform operations. The operations include receiving a first wireless measurement report from a mobile device, wherein the first wireless measurement report comprises a first received signal strength measurement and a first signal vector for a first access point device. The operations also include determining a first tile representing a first set of locations in which the mobile device is located based on the first wireless measurement report. The operations further include determining a second tile representing a second set of locations in which the mobile device is located based on a second wireless measurement report received from the mobile device, wherein the first tile and the second tile are convex hulls. The operations also include determining an area in which the mobile device is located based on determining overlapping portions of the first tile and the second tile.

FIG. 1 is an example non-limiting schematic diagram 100 of overlapping tiles according to an aspect or embodiment of the subject disclosure. Each of the signal tiles 102, 104 and 106 can be locations in which a mobile device can be located on based on RSSIs received from access points $AP_1$, $AP_2$, and $AP_3$ respectively. The localization system disclosed herein can generate the tiles, which are convex hulls that envelope a set of points in a Euclidean plane within which a target can be located. For each AP, a tile is constructed where the target is likely within based on the RSSI of the AP. Given each of the tiles, their junction 108 is where the target is likely to be within. This effectively mitigates signal noise by tightening the search space without leading to a disperse set of reference points.

Given a certain target RSSI of an AP, the localization system disclosed herein constructs a tile where the target is likely within based on the first two moments of the signal (mean and variance). Such a tile can be efficiently computed with algorithms in computational geometry, and is represented by a set of linear constraints. Given the set of constructed tiles, the target is likely at the junction of the largest number of overlapping tiles. The localization system can use an algorithm to find such a set of "maximally overlapping tiles," which can then be used as constraints to estimate the target location.

Figure 2:
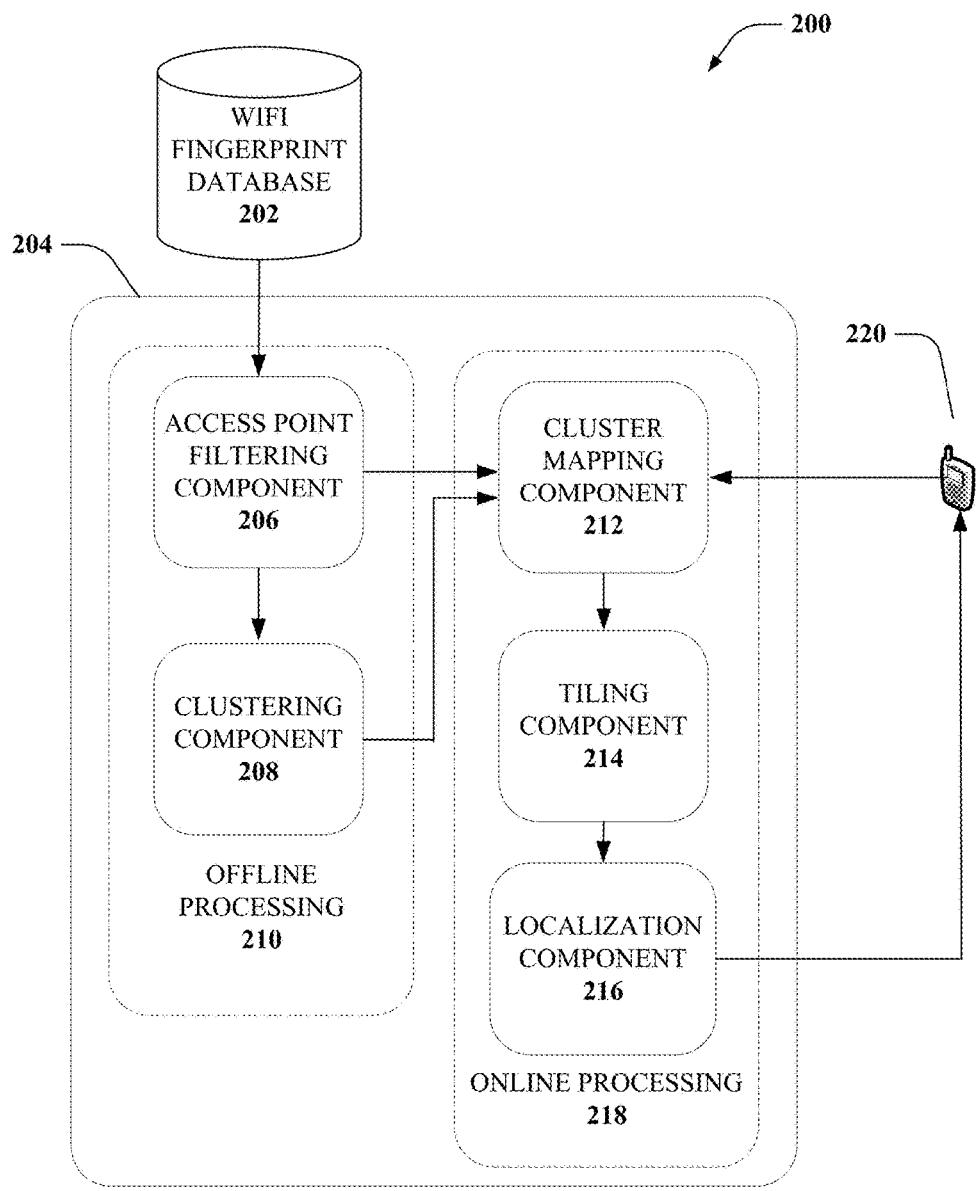
FIG. 2 is an example non-limiting schematic diagram of a localization system according to an aspect or embodiment of the subject disclosure.

Turning now to FIG. 2, illustrated is an example non-limiting schematic diagram 200 of a localization system according to an aspect or embodiment of the subject disclosure. The localization system 204 can include an offline processing module 210 that performs some of the processing including filtering APs and clustering RPs offline, and an online processing module 218 that performs the localization processing on the RSSIs from the mobile device 220.

The Wi-Fi Fingerprint Database 202 can be initialized by a site survey that stores pairs <location, RSSI> at a set of reference points at each site and also store version information. The AP filtering component 206 can filter out the APs with narrow signal ranges (i.e., low dynamic signal range) below a predetermined threshold and keeps the remainder for localization. The first two moments, mean and variance, of the RSSIs at each RP can also be estimated at this stage. Using the filtered APs, the clustering component 208 can partition the area into smaller regions and/or clusters and elect a number of exemplary RPs for each cluster.

Once the preprocessing is performed, the localization system 204 can begin processing of RSSIs from mobile device 220. The cluster mapping component 212 can map the mobile device 220 to an RP cluster based on comparing the measured signal vector of the mobile device 220 to one or more of the exemplary RP signal vectors which can represent virtual signals received at the RP location. Once the cluster mapping component 212 determines which cluster the mobile device 220 is in, the tiling component 214 constructs signal tiles based on the mobile device 220's RSSI measurements of APs. The localization component 216 can perform linear-programming based localization to determine where the maximum number of tiles overlap, which can be the estimated location of the mobile device 220.

In an embodiment, the cluster mapping component 212 receives a first wireless signal report (RSSI) associated with an access point from the mobile device 220. The cluster mapping component 212 can determine which cluster or area the mobile device 220 is located in and then tiling component 214 can determine a first tile, or convex hull in which the mobile device is located in based on the RSSI. The cluster mapping component 212 can also receive a second wireless signal report (RSSI) associated with another access point from the mobile device 220 and the tiling component 214 can determine a second tile that the mobile device 220 is located in. Localization component 216 can then locate the mobile device 220 based on determining the area in which the tiles overlap. This process can be scaled up as more signal reports associated with additional access points are received, with each new tile further constraining the area in which the mobile device 220 is located, increasing the accuracy.

In the following equations and functions disclosed herein, the symbols disclosed herein are shown in Table 1 below.

TABLE 1

| Notation | Definition |
| --- | --- |
| $y_n^l(\tau)$ | $\tau$-th RSS sample at RP n from AP l |
| $T_n^l$ | Number of RSSI samples at RP n for AP l |
| $Y_n^l$ | Random variable of RSSI at RP n (dBm) |
| $\alpha_n^l$ | Autocorrelation of signal sequence at n for l |
| $q_n$ | Wi-Fi RSSI vector received at RP n |
| $p$ | Wi-Fi RSSI vector received at target |
| $\psi_n^l$ | RSSI at n for AP l (dBm) |
| $\sigma_n^l$ | Standard deviation of $\psi_n^l$ at RP n for l (dB) |
| $\sigma^l$ | RSSI standard deviation at target for l (dB) |
| $\phi^l$ | RSSI at target for l (dBm) |
| $\hat{x}$ | Estimated 2-D coordinate of target |
| $r_n$ | 2-D coordinate of reference point (RP) n |
| $C_m$ | Index of RPs in the selected cluster m |
| $Q_m$ | Index of RP exemplars in cluster m |
| N | Number of RPs in fingerprint database |
| $\omega_n$ | Weight of RP n in target estimation |
| K | Number of RP clusters |
| L | Number of APs |
| L | Set of tiles with maximal overlapping |
| $B^l$ | Edges of tile for AP l |
| $B^u$ | Set of edges in map constraint |

The transmitters and receivers of the access points can include omnidirectional antennas and the received signal strength, RSS $\phi$ (dBm) at distance D from an AP is given by the log-normal shadowing model:

$$\phi = P^{TX} - L^{(0)} - 10\alpha \log_{10}\left(\frac{D}{D^{(0)}}\right) + S, \qquad \text{Equation 1}$$

where $S \sim \mathcal{N}(0, \sigma_{dB}^2)$ is the measurement noise. In simulations, the transmission $P^{TX}$ 25 dBm, the path loss exponent $\alpha$ 4.0, the reference path loss $L^{(0)}$ 37.7 dBm [2] and the reference distance $D^{(0)}$ 1 m. Based on our experimental observations, if $\phi < -95$ dBm, the target cannot detect the AP signal. The APs are uniformly deployed in the site in each round of deployment power.

Various localization algorithms are compared to the localization algorithm disclosed herein, and the simulation results are plotted on several graphs disclosed in the Figures. The algorithms are evaluated in terms of location error. The estimated location is denoted as $\hat{x}_u$ and the true location as $x_u$. Localization error is given by $e_u = \|\hat{x}_u - x_u\|_2$. Given a set of the target users U, the overall performance can be evaluated by the mean error (ME):

$$ME = \frac{1}{|U|} \sum_{u=1}^{|U|} e_u. \qquad \text{Equation 2}$$

Figure 3:
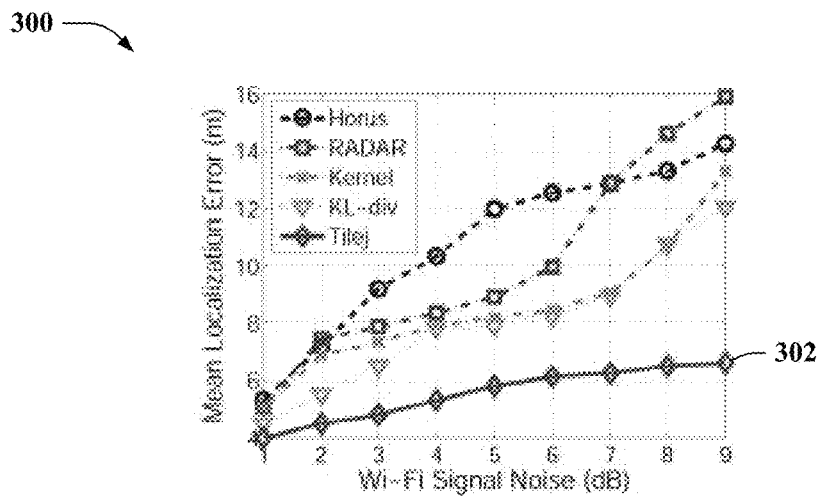
FIG. 3 is an example non-limiting graph showing localization error vs. signal noise according to an aspect or embodiment of the subject disclosure.

FIG. 3 illustrates an example non-limiting graph 300 showing localization error vs. signal noise according to an aspect or embodiment of the subject disclosure. Line 302 represents the simulation results of the disclosed localization system. The mean localization error in meters degrades as the Wi-Fi signal noise increases, mainly due to dispersed nearest neighbors in signal space. Since the disclosed localization system considers the first two moments in signal noise for tile construction, mean and variance, the adverse effect of signal noise is mitigated compared to the other algorithms.

Figure 4:
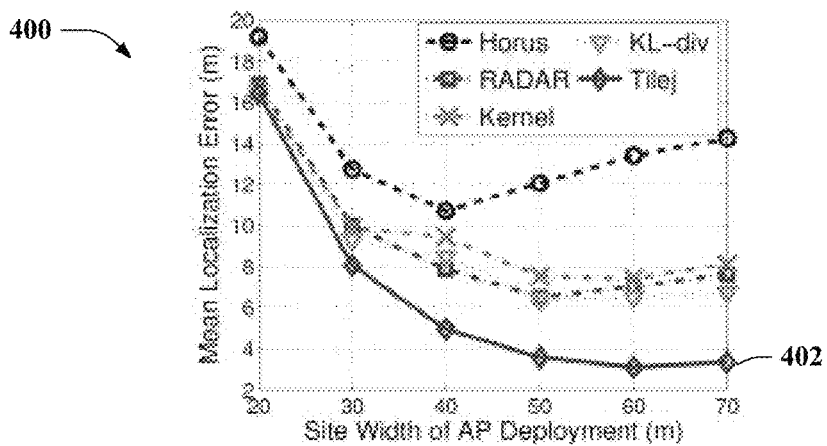
FIG. 4 is an example non-limiting graph showing mean error vs. site width according to an aspect or embodiment of the subject disclosure.

FIG. 4 illustrates an example non-limiting graph 400 showing mean error vs. site width according to an aspect or embodiment of the subject disclosure. Line 302 represents the simulation results of the disclosed localization system. In this simulation, the site width (a square) is changed to change the AP installation density. In general, the error first decreases and then increases. This is because localization error can depend on two factors: AP fingerprint differentiation in the site and the number of APs detected at a location. When the site is small, the AP fingerprints are very similar among all the RPs. Therefore, the error is high. As the width increases, there is more AP signal differentiation in the site, and hence the error decreases. As the width further increases, the error increases because, as APs are deployed in a sparser manner, the number of APs detected at a location decreases. The result shows that without sufficient AP signal differentiation, high AP density would not help. It also shows that the localization system disclosed herein as represented by line 402 achieves substantially the lowest error as compared with the other schemes, as the tiles using the first two moments of signals mitigate adverse effect of noise.

Figure 5:
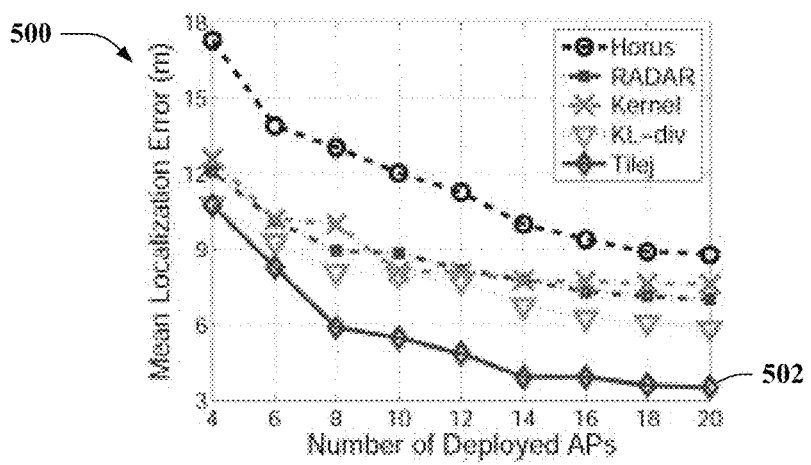
FIG. 5 is an example non-limiting graph showing localization error vs. deployed AP number according to an aspect or embodiment of the subject disclosure.

Turning now to FIG. 5, illustrated is an example non-limiting graph 500 showing localization error vs. deployed AP number according to an aspect or embodiment of the subject disclosure. Line 502 represents the simulation results of the disclosed localization system. When the AP number increases, localization error decreases because more APs helps localize the target to smaller area. There is diminishing return of adding an extra AP, because signal (or fingerprint) differentiation reduces as more APs are added to a fixed area. It also shows that the localization system disclosed herein as represented by line 502 achieves the highest accuracy due to its joint consideration of measurement noise and use of junction of tiles.

Figure 6:
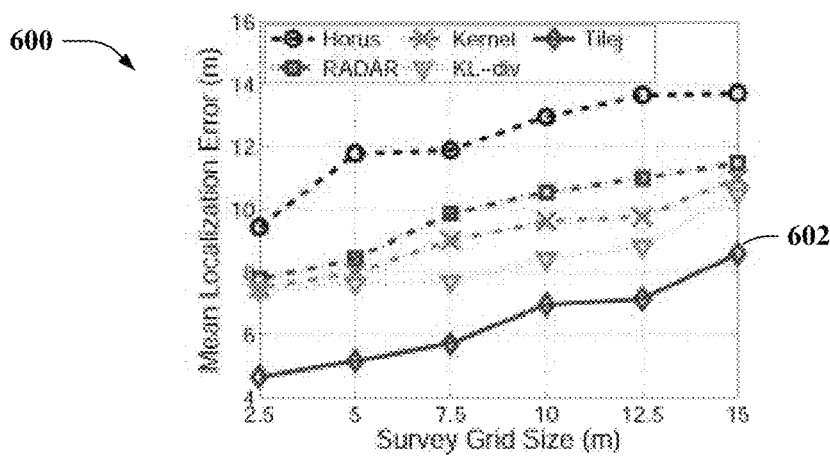
FIG. 6 is an example non-limiting graph showing localization error vs. survey grid size according to an aspect or embodiment of the subject disclosure.

Turning now to FIG. 6 illustrated is an example non-limiting graph 600 showing localization error vs. survey grid size according to an aspect or embodiment of the subject disclosure. Line 602 represents the simulation results of the disclosed localization system. Accuracy suffers as grid size increases, because signal uncertainty more easily leads to incorrect matching to distant RPs. It also illustrates the tradeoff between survey cost and localization accuracy.

Figure 7:
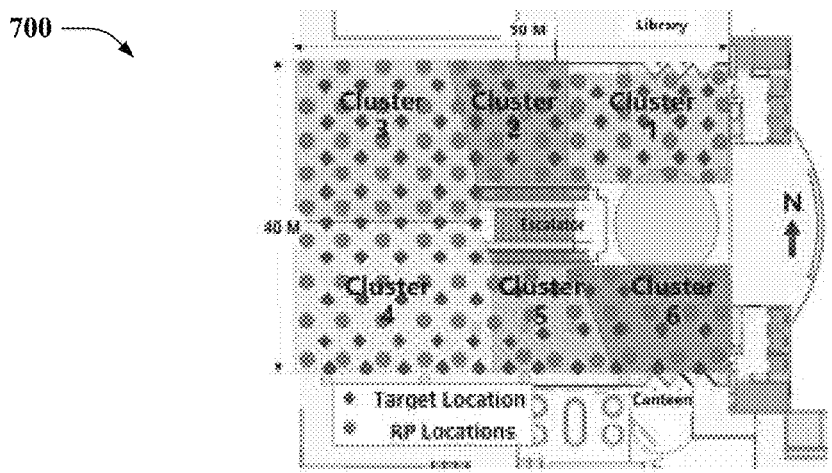
FIG. 7 is an example non-limiting schematic diagram showing an exemplary floor plan and RP clusters according to an aspect or embodiment of the subject disclosure.
Figure 8:
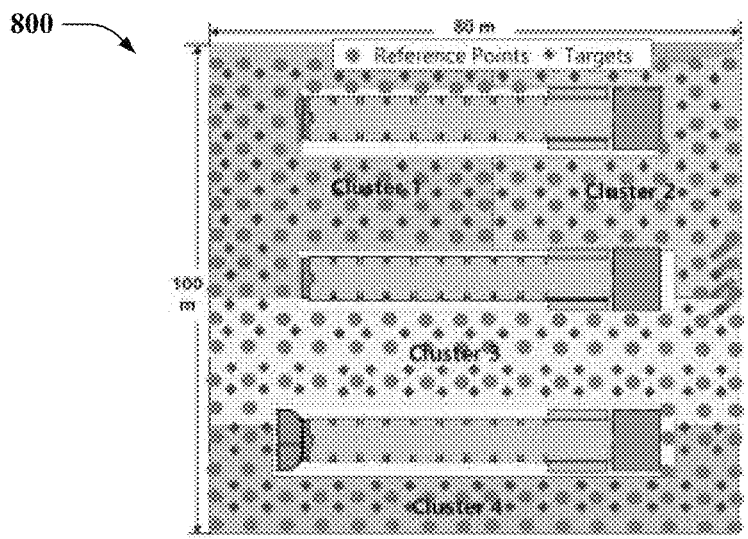
FIG. 8 is another example non-limiting schematic diagram showing an exemplary floor plan and RP clusters according to an aspect or embodiment of the subject disclosure.

FIGS. 7-8 show maps of clusters for two locations where experimental trials were conducted, Location 1, and Location 2 respectively. Table 2 provides summarized settings for each site.

TABLE 2

| Survey Sites | Location 1 | Location 2 |
| --- | --- | --- |
| Size (m²) | 2,000 | 8,000 |
| # RPs | 183 | 220 |
| # Clusters | 6 | 4 |
| # Targets | 800 | 1,100 |
| # APs | 323 | 360 |
| Average APs/RP | 32 | 46 |
| Average APs/Target | 28 | 28 |

At each RP at both sites, data is sampled from four different directions (north, west, south and east). For each direction, a certain number (15) samples of RSSI vectors are collected. In the data preprocessing, the mobile APs tethered by smartphones are filtered out, and combine virtual APs (VAPs). The Wi-Fi APs are pre-deployed by independent bodies of the site and their actual mounted positions may not be known. At each RP, the probability of measuring an AP (15 samplings) is 76% on average in Location 1 (55% in Location 2). 5 m is used as the grid size in both sites.

By facing each of the four different directions, 5 samples are collected at each target position. The target samples were collected one month later than RP collection. The survey is conducted under normal condition (work hour), so there may be crowds nearby. The time interval between samples in RP sampling and target sampling is 1 second. FIG. 7 and FIG. 8 shows the survey floor plans with clustered RP and target locations at Location 1 and Location 2, respectively.

The localization system is compared with the same algorithms as above in the simulation at each of these Locations 1 and 2. The following baseline is used: 4 exemplars at each cluster; $z_0=1$; 20 APs with the highest entropy are used for Tile junction localization; w=3 dB in Equation 33. Unless otherwise stated, the above parameters remain fixed. These algorithms are compared using the mean error in Equation 2. For cluster mapping, the number of targets are denoted which are correctly mapped to their nearest clusters as $n_c$. The accuracy of the cluster mapping is defined as:

$$\text{Accuracy} = \frac{n_c}{|U|}. \qquad \text{Equation 3}$$

Figure 9:
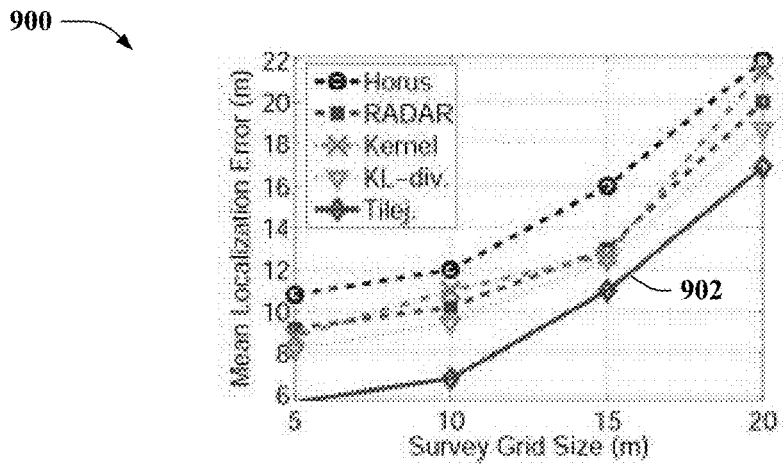
FIG. 9 is an example non-limiting graph showing localization error vs. survey grid size according to an aspect or embodiment of the subject disclosure.

FIG. 9 illustrates an example non-limiting graph 900 showing localization error vs. survey grid size according to an aspect or embodiment of the subject disclosure. As the minimum grid size is five meters, lines or rows of RPs are removed to form grid size with multiples of five. All six algorithms can degrade as grid size increases. The disclosed localization system, as shown by line 902, has higher localization accuracy than other algorithms for different grid size. This can be because it utilizes the signal tiles through the joint optimization and reduces the influence from measurement noise.

Figure 10:
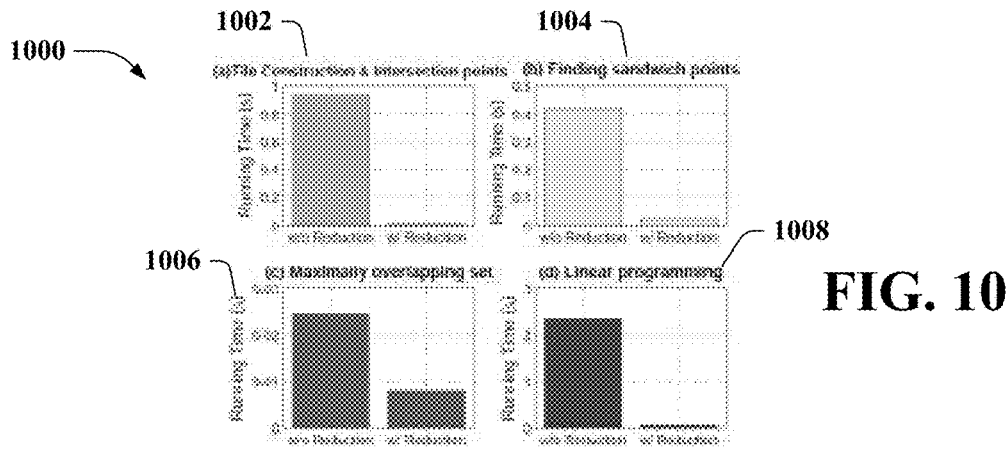
FIG. 10 depicts exemplary, non-limiting graphs showing computational time reduction according to an aspect or embodiment of the subject disclosure.

FIG. 10 depicts exemplary, non-limiting graphs 1000 showing computational time reduction according to an aspect or embodiment of the subject disclosure. FIG. 10 shows the mean computational time of 800 targets at Location 1 for four components: tile construction and intersection points 1002; finding sandwich points 1004; finding maximally overlapping set of tiles 1006; and linear programming 1008. It corresponds to the theoretical analysis in Table 3 shown below. Significant computation reduction through cluster mapping and AP filtering can be achieved as shown in FIG. 10.

Figure 11:
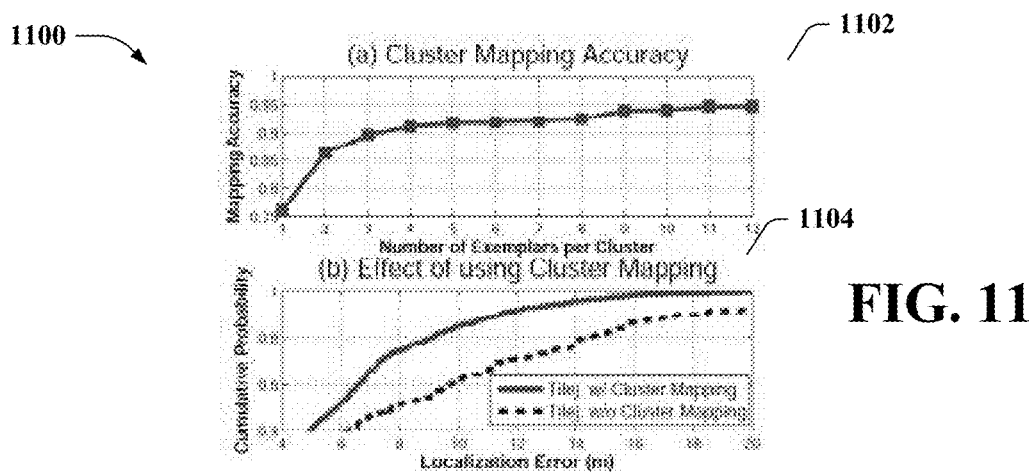
FIG. 11 depicts exemplary, non-limiting graphs showing mapping accuracy and accuracy improvement according to an aspect or embodiment of the subject disclosure.

FIG. 11 depicts exemplary, non-limiting graphs 1102 and 1104 showing mapping accuracy and accuracy improvement according to an aspect or embodiment 1100 of the subject disclosure at Location 1. 1102 shows the cluster mapping accuracy against the number of exemplars used. The accuracy increases quickly as the exemplar number increases and then stabilizes at a few exemplars (around four to five). It is because the exemplars added later contribute less to the estimation accuracy. With a few representatives, the target can be mapped to one of the clusters. 1104 shows how accuracy improves when applying RP clustering and mapping. The accuracy improvements can be be to cluster mapping reducing the set of disperse nearest neighbors and the target can be located without large error deviation.

Figure 12:
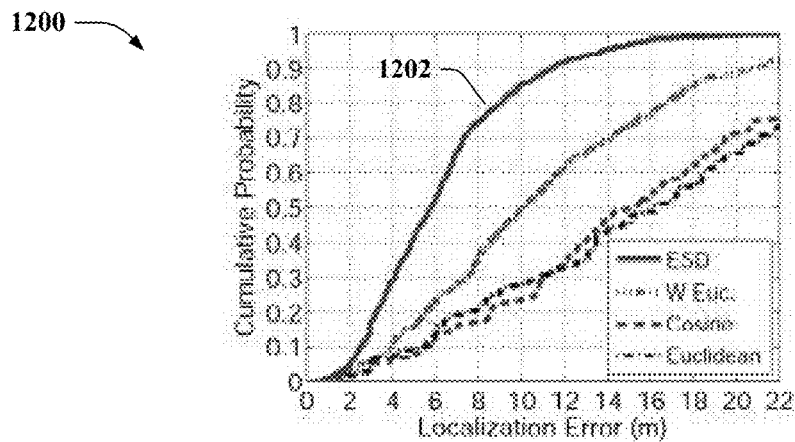
FIG. 12 is an example non-limiting graph showing localization errors according to an aspect or embodiment of the subject disclosure.

FIG. 12 illustrates an example non-limiting graph 1200 showing localization errors at Location 1 according to an aspect or embodiment of the subject disclosure. FIG. 12 compares the performance of expected signal difference (ESD) with weighted Euclidean (W Euc.), Cosine similarity and traditional Euclidean distance. The target RSSI vector can be denoted as p and fingerprint data can be denoted as $q_j$. Euclidean distance ($E_d=\|p-q_j\|_2$) and cosine similarity do not consider the signal variance in the noisy measurement and thus cannot discriminate the disperse nearest neighbors with large signal change. Weighted Euclidean distance ($E_w = \sqrt{\Sigma(\psi_n^l/\sigma_n^l - \phi^l)^2}$) aims to standardize the signal values but cannot represent the expected difference between two random signals. Therefore, it cannot effectively differentiate the RPs with similar signal measurement. In contrast, ESD 1202 discriminates the fingerprints by penalizing the RPs that have large signal variance. Thus, the influence from the noise in the measurement is mitigated more effectively than Euclidean, Weighted Euclidian, and cosine methods.

Figure 13:
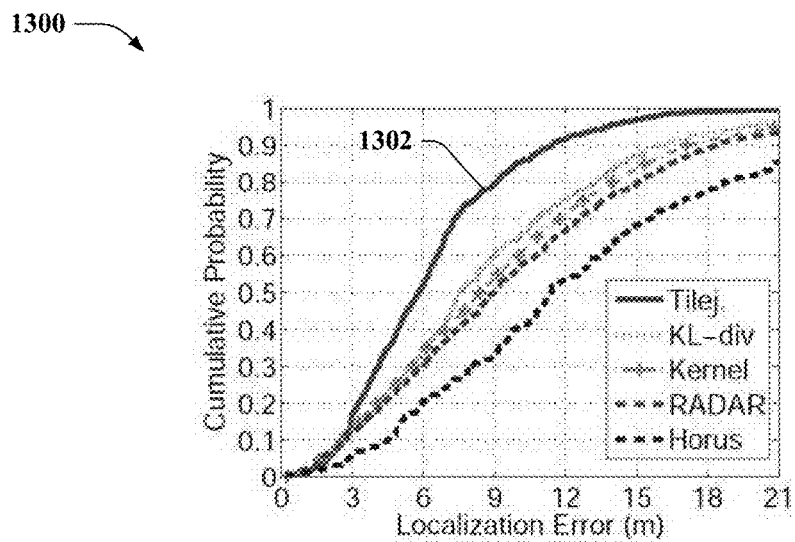
FIG. 13 is an example non-limiting graph showing cumulative distribution of localization errors according to an aspect or embodiment of the subject disclosure.

Turning now to FIG. 13, illustrated is an example non-limiting graph 1300 showing cumulative distribution of localization errors at Location 1 according to an aspect or embodiment of the subject disclosure. Due to large measurement noise in Location 1, RADAR's accuracy is weakened by the disperse nearest neighbors. Horus assumes a certain distribution of signal level at each RP and therefore cannot represent real signal distribution under limited sampling. Kernel-based and KL-divergence also require large data sampling and dense fingerprints in signal distribution comparison. Therefore, they do not adapt to the noisy environment in Location 1. The localization system disclosed herein, as represented by line 1302, considers the signal noise using tile constraints and therefore reduces the misestimation.

Figure 14:
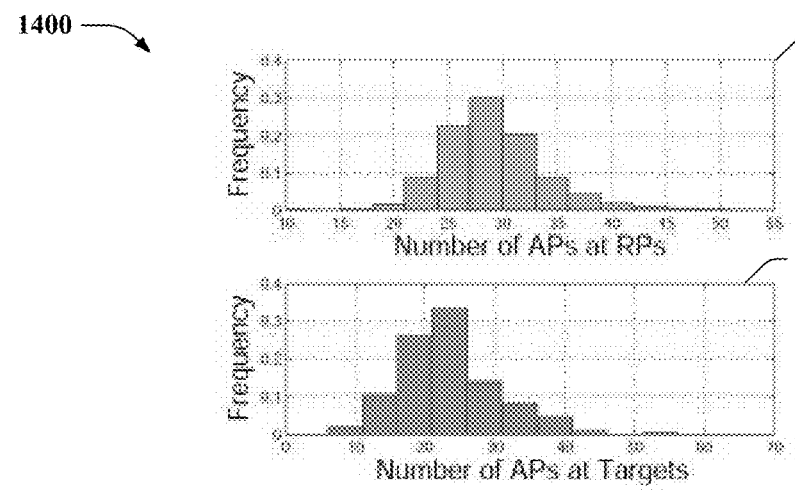
FIG. 14 depicts exemplary, non-limiting graphs showing histograms of measured APs at RPs and targets according to an aspect or embodiment of the subject disclosure.

Turning now to FIG. 14, illustrated are exemplary, non-limiting graphs 1402 and 1404 showing histograms of measured APs at RPs and targets according to an aspect or embodiment 1400 of the subject disclosure. FIG. 14 shows the number of APs detected at each RP (1402) and target (1404) at Location 1. On average, each RP in Location 1 can measure 32 APs and each target in Location 1 can detect 28 APs. The number of APs is due to uncoordinated AP deployment from different parties at different floors or locations. As some targets may measure many APs, AP filtering can be conducted to facilitate the calculation of the location of the targets.

Figure 15:
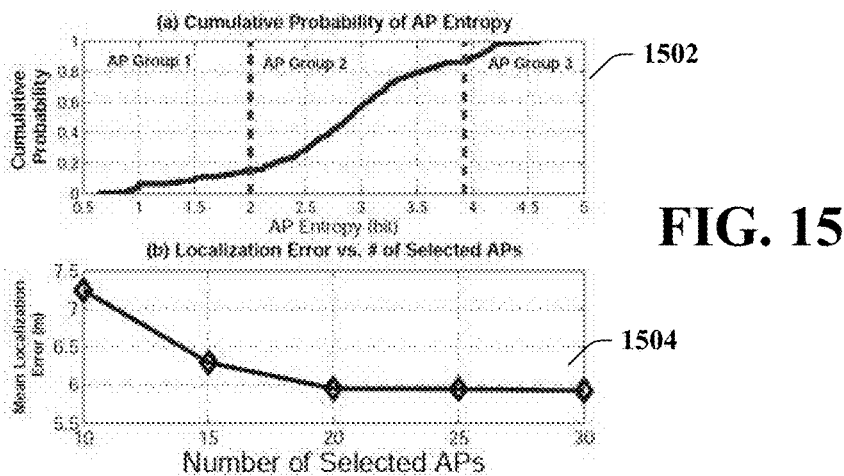
FIG. 15 depicts exemplary, non-limiting graphs showing cumulative distribution functions of AP entropy and location error vs. selected AP number according to an aspect or embodiment of the subject disclosure.

Turning now to FIG. 15, illustrated are exemplary, non-limiting graphs 1502 and 1504 showing cumulative distribution functions of AP entropy (1502) and location error vs. selected AP number (1504) according to an aspect or embodiment 1500 of the subject disclosure.

Related analysis is performed to illustrate the AP filtering based on information entropy in FIG. 15. In 1502, the cumulative probability of Wi-Fi AP entropy in the survey site is plotted. Two turning points (dashed lines) can be observed in the cumulative distribution, which forms three groups of APs. Therefore, in the AP filtering, the group of APs is selected on the right with the highest entropy. Based on these selected APs, 1504 plots the mean localization error against the number of APs selected. The APs are sorted according to their entropy. Then the APs with high entropy are selected. Error converges after the top few APs are selected which correspond to the right group in 1502.

Figure 16:
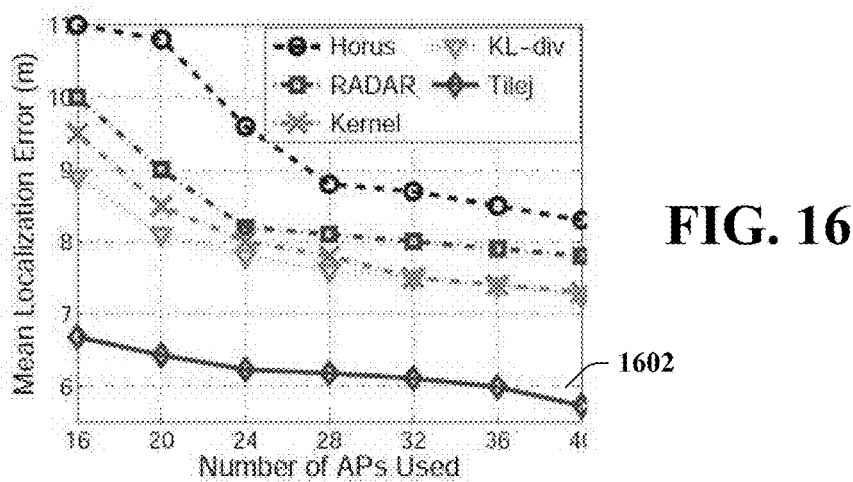
FIG. 16 is an example non-limiting graph showing mean localization error vs. the number of APs used according to an aspect or embodiment of the subject disclosure.

Turning now to FIG. 16, an example non-limiting graph 1600 showing mean localization error vs. the number of APs used according to an aspect or embodiment of the subject disclosure.

The performance of five algorithms against the number of APs used is plotted in 1600. By fixing a number of detected APs at target side, the APs can be randomly selected to detect to simulate the miss of the RSSI due to crowds of people or site construction change. As the number of APs used increases, all five algorithms' performance improves and then converges. The localization system disclosed herein, as represented by line 1602, is less susceptible than other four algorithms under AP detection change. This can be due to RP clustering and tile junctioning can constrain the target in a small region and reduce the disperse set of nearest neighbors.

Figure 17:
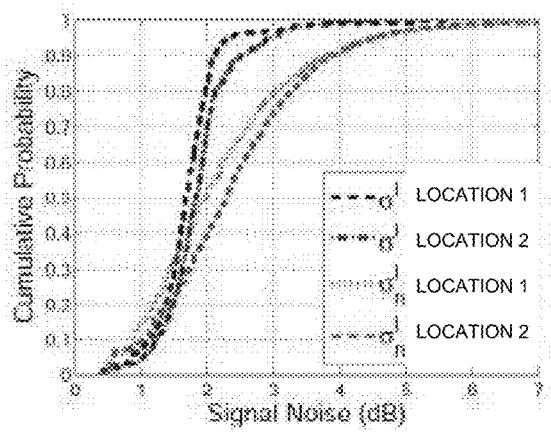
FIG. 17 is an example non-limiting graph showing a cumulative distribution function according to an aspect or embodiment of the subject disclosure.

Turning to FIG. 17, illustrated is an example non-limiting graph 1700 showing a cumulative distribution function according to an aspect or embodiment of the subject disclosure. 1700 shows the signal noise ($\sigma^l$ in Equation 11 and $\sigma_n^l$ in Equation 9) in the two sites. Note that $\sigma^l$ represents the average signal noise at the target, while $\sigma_n^l$ means the average signal noise at the RPs. The signal noise in Location 2 can be observed to be slightly larger than that in Location 1.

Figure 18:
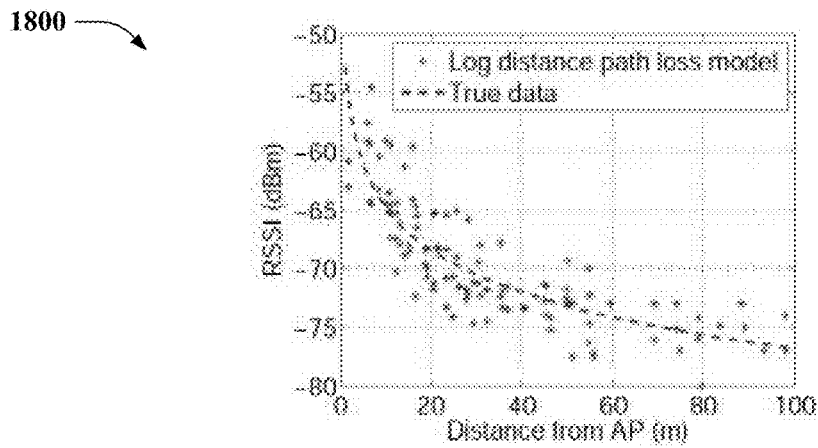
FIG. 18 is an example non-limiting graph showing a scatter plot of Wi-Fi RSSI vs. distance from an AP according to an aspect or embodiment of the subject disclosure.

Turning to FIG. 18, illustrated is an example non-limiting graph 1800 showing a scatter plot of Wi-Fi RSSI vs. distance from an AP according to an aspect or embodiment of the subject disclosure. 1800 shows RSSI values versus the distances from an AP. The plot is generated based on the collected fingerprint data from Location 2. Generally, as distance increases, the RSSI decreases. Due to multipath effect, the signal variance at different distances may be varied.

Figure 19:
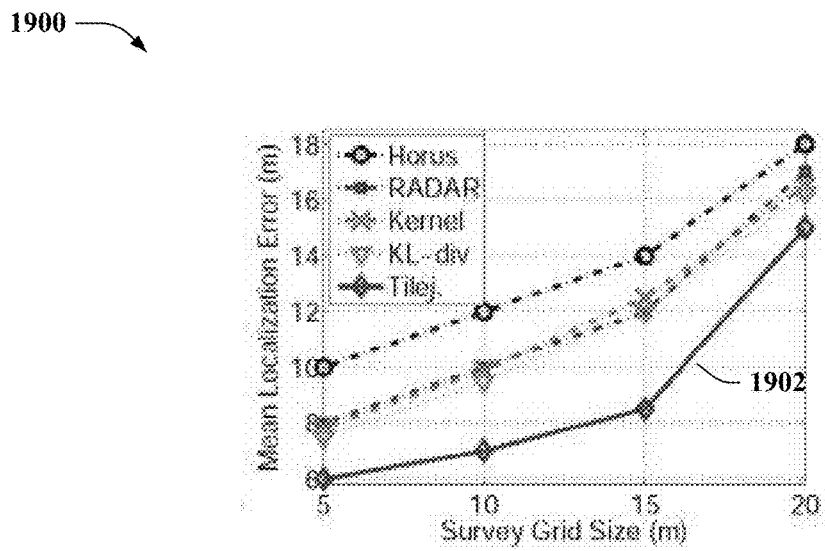
FIG. 19 is an example non-limiting graph showing mean localization error vs. survey grid size according to an aspect or embodiment of the subject disclosure.
Figure 20:
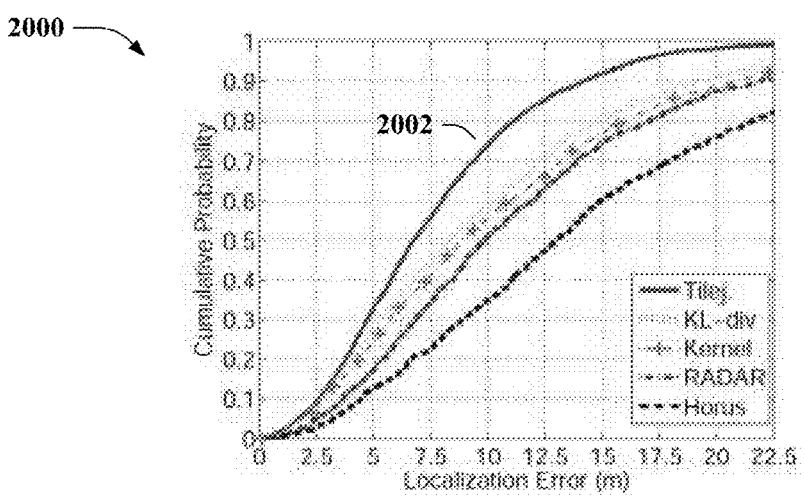
FIG. 20 is an example non-limiting graph showing cumulative distribution function of localization errors according to an aspect or embodiment of the subject disclosure.

Turning now to FIG. 19, illustrated is an example non-limiting graph 1900 showing mean localization error vs. survey grid size according to an aspect or embodiment of the subject disclosure. FIG. 19 shows that the performance of all algorithms degrades when the grid size increases and the localization system disclosed herein, represented by line 1902 achieves higher accuracy under all training grid sizes. FIG. 20 shows the overall performance of different algorithms in Location 2. Similar to Location 1, the localization system disclosed herein, as represented by line 2002, in Location 2 still achieves higher accuracy and robustness than other state-of-the-art algorithms.

In the following paragraphs, further discussion for how to construct the tiles and overlap detections is provided. First how to construct a tile where the target is likely within is described, given the first two moments of the measurement noise of signals, Then an efficient algorithm is presented to find the set of maximally overlapping tiles (i.e., the set with the maximum number of overlapping tiles), followed by corresponding complexity analysis.

For tile construction under measurement noise, let N and L be the total number of RPs and distinct APs detected in the whole survey site, respectively. Further let $\tilde{Y}_n^l$ be the random variable of the RSS collected at RP n for AP l in the offline fingerprint collection, where $1 \leq n \leq N$ and $1 \leq l \leq L$. Multiple RSSI samples are collected at different time τ indexed by 1, 2, . . . for RP n and AP l. The samples can be noted as $\{y_n^l(\tau)|\tau=1, \ldots, T_n^l, T_n^l>1\}$, where $T_n^l$ is the total number of samples collected.

The unbiased estimate of $E(\tilde{Y}_n^l)$ is denoted as $\hat{\mu}_n^l$, which is simply given by the mean of $y_n^l(\tau)$'s, i.e.

$$\hat{\mu}_n^l = \frac{1}{T_n^l}\left(\sum_{\tau=1}^{T_n^l} y_n^l(\tau)\right). \qquad \text{Equation 4}$$

The unbiased estimate on the variance of $\tilde{Y}_n^l$ is denoted as $\hat{\sigma}^2(\tilde{Y}_n^l)$, given by:

$$\hat{\sigma}^2(\tilde{Y}_n^l) = \frac{1}{T_n^l} = \frac{1}{T_n^l - 1}\left(\sum_{\tau=1}^{T_n^l}(y_n^l(\tau) - \hat{\mu}_n^l)^2\right). \qquad \text{Equation 5}$$

$y_n^l(\tau)$'s are the realized values of the measured fingerprint signals, denoted by the random variable $Y_n^l(\tau)$'s. Let $\psi_n^l$ Let $\psi_n^l$ be the mean of $Y_n^l(\tau)$ at RP n for AP l, i.e.

$$\psi_n^l = \frac{1}{T_n^l}\sum_{\tau=1}^{T_n^l} Y_n^l(\tau). \qquad \text{Equation 6}$$

Due to data cache and other factors, the RSSI sequence obtained from the smartphones may be correlated. Let $V(\tau)$ be an i.i.d. noise process independent of $Y_n^l(\tau)$. Let $\alpha_n^l$ be the parameter representing the autocorrelation of samples at RP n from AP l. Thus, the signal time series (assuming correlation between consecutive samples) can be represented as a first-order autoregressive model, i.e.

$$Y_n^l(\tau) = \alpha_n^l Y_n^l(\tau - 1) + (1 - \alpha_n^l) V(\tau), \qquad \text{Equation 7:}$$

Where $\alpha_n^l$ can be approximated by autocorrelation coefficient with lag one. Therefore, for $\psi_n^l$, its expected value $\overline{\psi}_n^l$ and standard deviation $\sigma_n^l$ can be estimated as:

$$\overline{\psi}_n^l = \hat{\mu}_n^l, \qquad \text{Equation 8}$$
and $$\sigma_n^l = \left\{\frac{\hat{\sigma}^2(\tilde{Y}_n^l)}{(T_n^l)^2}\left[\left(\frac{1-(\alpha_n^l)^{T_n^l}}{1-\alpha_n^l}\right)^2 + T_n^l - 1 - (\alpha_n^l)^2\frac{1-(\alpha_n^l)^{2(T_n^l-1)}}{1-(\alpha_n^l)^2}\right]\right\}^{1/2}, \qquad \text{Equation 9}$$

respectively [31]. $(\sigma_n^l)^2$ indicates the variability of the estimation mean at each RP n for AP l. To summarize, Equations 8 and 9 represent the two moments of the RSSI at RPs when constructing the signal tiles.

The fingerprint RSSI vector at RP n can be formed by $$q_n = [\overline{\psi}_n^1, \overline{\psi}_n^2, \ldots, \overline{\psi}_n^L], \qquad \text{Equation 10:}$$

where, by definition, $\overline{\psi}_n^l = 0$ AP l is not detected at RP n. In the online stage, let $\phi^l$ be the target measurement of AP l. Let $(\sigma^l)^2$ be its variance, estimated as the global average of the variance in all the fingerprints:

$$\sigma^l = \left\{\frac{1}{|N^l|}\left(\sum_{n\in N^l}\hat{\sigma}^2(\tilde{Y}_n^l)\right)\right\}^{1/2}, \qquad \text{Equation 11}$$

where $N^l$ is the set of RPs detecting AP l in the site and $|N^l|$ is its cardinality. The RSSI vector at the target is represented as:

$$p = [\phi^1, \phi^2, \ldots, \phi^L], \qquad \text{Equation 12:}$$

where, by definition, $\phi^l = 0$ if AP l is not detected at the target. Given the above, the variance of the signal difference between the target and fingerprint at RP n for AP l is then (assuming independence):

$$\text{Var}(\phi^l - \psi_n^l) = (\sigma^l)^2 + (\sigma_n^l)^2, \qquad \text{Equation 13:}$$

which represents the overall signal fluctuation at RPs and target. The fingerprint collection is conducted under normal indoor scenarios (e.g., with signal noise from neighboring crowd movement or reflection from walls). Thus, the first two moments of collected real signals can be used to capture the potential noise.

A tile for AP l is a convex hull enclosing a set of RPs, denoted as $R^l$, where the target is likely within. Here $R^l$ consists of RPs whose signal strength of AP l is unlikely lower than $\phi^l$ (so that the convex hull formed by the RPs encloses the target). It is hence obtained by excluding the RPs whose signal is likely lower than the target's. In other words, RP n is excluded if $P(\psi_n^l < \phi^l)$ is higher than a certain value, i.e.:

$$\phi^l - \overline{\psi}_n^l > z_0\sqrt{\text{Var}(\phi^l - \psi_n^l)}, \qquad \text{Equation 14:}$$

for some $z_0 > 0$ meeting such a probability requirement.

By reversing Equation 14, the signal tile for AP l is constructed as follows:

Definition 5.1 Given a target signal measurement $\phi^l$, $R^l$ is obtained consisting of RPs so that (from Equations 13 and 14)

$$\overline{\psi}_n^l \geq \phi^l - z_0\sqrt{(\sigma^l)^2 + (\sigma_n^l)^2}. \qquad \text{Equation 15:}$$

A tile for the signal of AP l is the convex hull $CH(R^l)$, defined as a continuous 2-D space where any interior point n can be expressed as:

$$n = \sum_{i=1}^{|R^l|} \kappa_i r_i^l, \qquad \text{Equation 16}$$

where $|R^l|$ is the cardinality (size) of $R^l$, $r_i^l$ is the coordinate of RP i in $R^l$, and $0 \leq \kappa_i \leq 1$ is its weight satisfying:

$$\sum_{i=1}^{|s^l|} \kappa_i = 1, \forall i. \qquad \text{Equation 17}$$

The convex hull can be constructed where the tile can be represented by linear line segments on its boundary.

The area overlapped by the maximum number of tiles is likely where the target is. To find such set of maximally overlapping tiles, termed the maximally overlapping set, the entrance and exit points of any two overlapping tiles are obtained.

Figure 21:
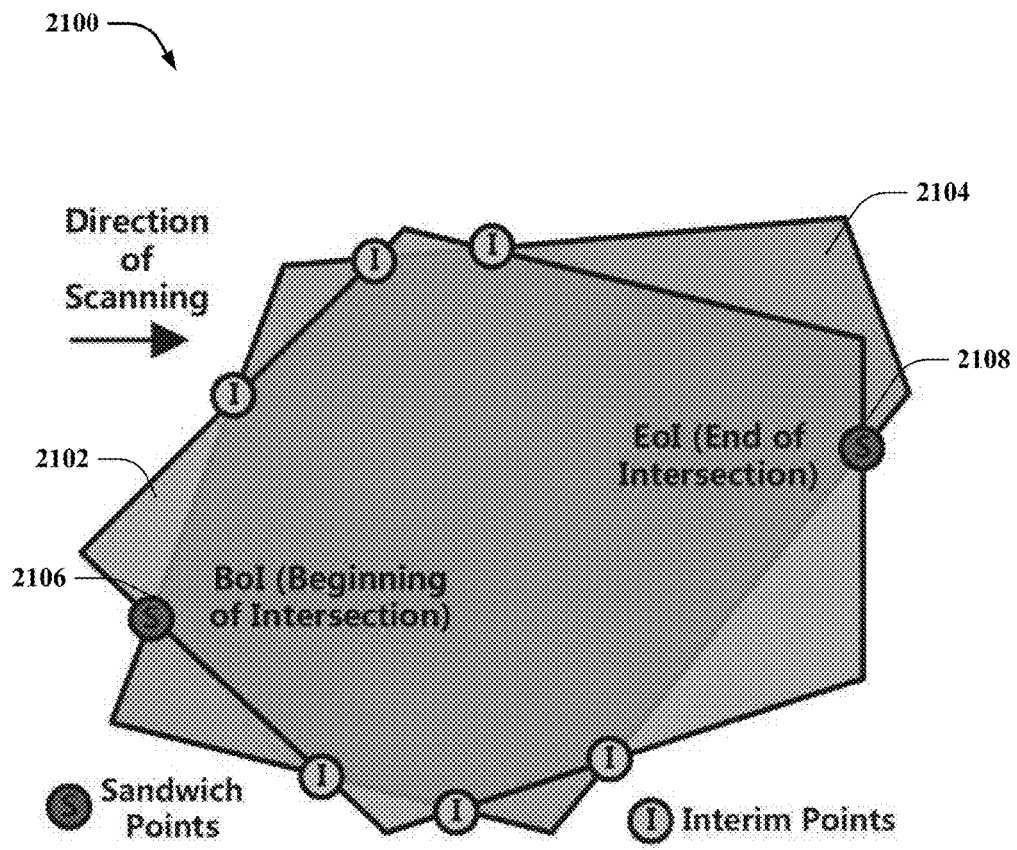
FIG. 21 is an example non-limiting schematic diagram showing sandwich points of two overlapping tiles according to an aspect or embodiment of the subject disclosure.

Consider any two tiles. All the intersection points of their line segments, if any, can be obtained efficiently through segment intersection algorithm [6]. In FIG. 21, two overlapping tiles 2102 and 2104 are with all their intersection points indicated as circles. If a line is swept horizontally from left to right (as indicated), out of all the intersection points, there is an entrance point of the overlap, termed Beginning of Intersection (BoI) 2106, and exit point of the overlap, termed End of Intersection (EoI) 2108. Given two convex hulls, the BoI 2016 and EoI 2108 are the ones with the smallest and largest X-coordinates, respectively (which can be easily found by a linear examination of the X-coordinate of the intersection points). These two extreme points can be called the sandwich points of the tiles.

For multiple tiles, all the pair-wise combinations of the tiles can be generated. For each pair, the above algorithm is run to get the sandwich points of the pair, with a flag (boolean) bit indicating whether it is EoI 2108 or not. As there are a maximum total of L tiles, there can be $\mathcal{O}(L^2)$ sandwich points.

Given the sandwich points of all the tile pairs, how to find the maximum number of overlapping tiles and the corresponding maximally overlapping set is presented. Each sandwich point is stored as a data structure consisting of its X and Y coordinates, which pair of intersecting tiles it refers to, and a boolean bit indicating whether it is EoI or not. These sandwich points are sorted according to their X-coordinates, and visit these points in their sorted order. If it is BoI 2106 (i.e., EoI bit as 0), the overlap counter is incremented by 1 and the intersecting pair is added to an overlap list (which can be implemented as a balanced tree structure for efficient lookup, insertion and deletion). If it is EoI 2108 (i.e., EoI bit as 1), the overlap counter is decremented by 1 and the intersecting pair is removed from the overlap list. At the end of visiting the sorted sequence of all the sandwich points, the maximum overlap number is found and its corresponding overlap list. The union of all the tiles in the overlap list is then the maximally overlapping set.

Figure 22:
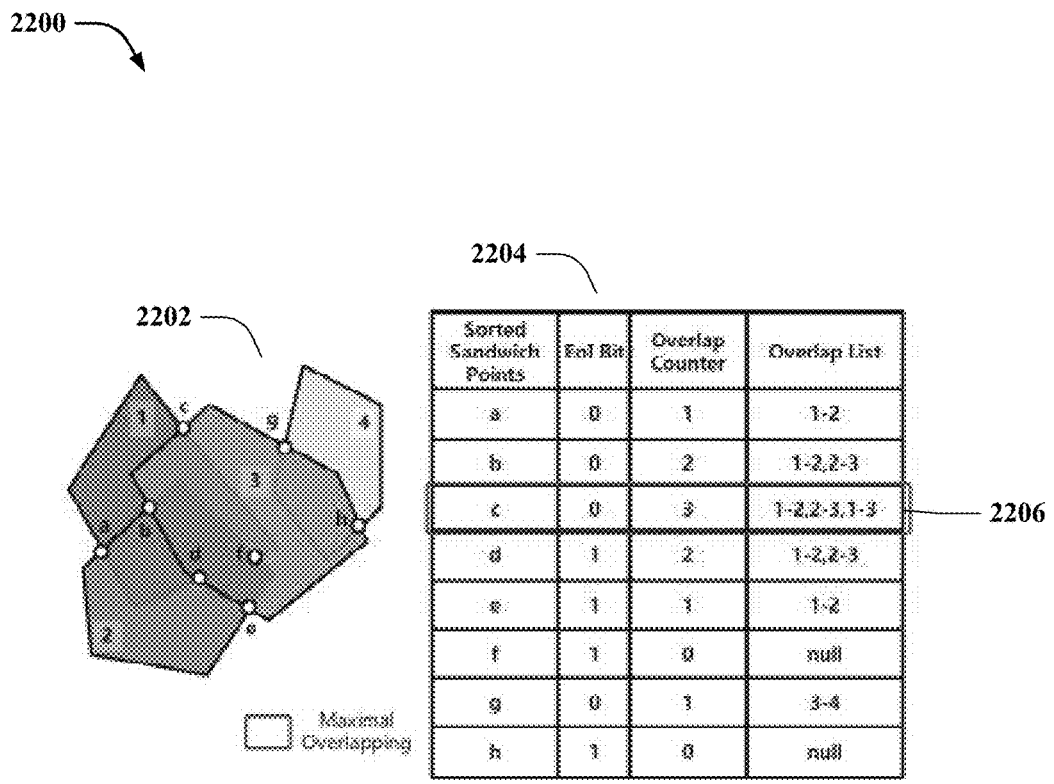
FIG. 22 is an example non-limiting schematic diagram showing a example of finding the maximum number of overlapping pairs according to an aspect or embodiment of the subject disclosure.

FIG. 22 illustrates the process of finding the maximum number of overlaps and the maximally overlapping set. There are four tiles labelled as 1, 2, 3 and 4 (corresponding to 4 APs) in 2202 with a total of eight sandwich points labelled as a, b, . . . , h in sorted order of their X-coordinates. As the sorted sandwich points are visited (from left to right), the intersecting pair of Tiles 1 and 2 is first put into the overlap list 2204, followed by the Pair 2-3 (due to BoI). Upon visiting the EoI of the Pair 2-3, the overlap counter is decremented by 1 and the Pair 2-3 is deleted from the list. After visiting sandwich point h, the maximum number of overlapping tiles is 3, with the union of the tile list {1, 2, 3} the maximally overlapping set 2206. These tiles will be used for localization (Tile 4 will be excluded as it is not involved in the maximally overlapping set.

The algorithm to find the maximum number of overlapping tiles and the maximally overlapping set is shown in FIG. 23. The overlap counter $N_s$ is initialized to record the number of overlapping pairs. $H_s$ and $\Lambda$ store the currently overlapping tiles and the maximally overlapping set discovered so far, respectively (Lines 1 to 4). Each time BoI (i.e., EoI bit=0) is encountered $N_s$ is incremented by 1. If EoI (i.e., EoI bit=1) is encountered, $N_s$ is decremented (Lines 5 to 12). The maximum number of overlapping pairs in Max and the corresponding tiles in $\Lambda$ (Lines 13 to 16) is kept.

After the maximally overlapping set L is obtained, the target is within the junction of the tiles in the set. For tile l∈L, let $B^l$ be the set of all its bounding line segments. Given the two ending points of each line segment, the target location, denoted as $\hat{x}=[\hat{x},\hat{y}]$, is then in the tile overlap region as linear constraints:

$$a_e^l \hat{x} + b_e^l \hat{y} + c_e^l \geq 0, e \in B^l, l \in L.$$ Equation 18:

The complexity of constructing tiles and finding maximally overlapped tiles is as follows. For tile Construction: With N RPs, a tile can be constructed within $\mathcal{N}(N \log N)$. Therefore, with L Wi-Fi APs, the total complexity of convex hull construction is provided by:

$$\mathcal{N}(LN \log N).$$ Equation 19:

Finding the maximally overlapped tiles consists of the following three steps A) Finding all the intersection points of the tiles: Each tile has O(N) edges. With $\mathcal{N}(L)$ tiles, there are overall $\mathcal{N}(LN)$ edges. Finding all the intersection points of these edges takes $$\mathcal{N}(LN \log(LN)).$$ Equation 20:

B) Given intersection points, finding all the sandwich points for pairwise tiles: As a tile is a convex hull, each of its edges intersects with the other tile of the pair at most two points. Finding the sandwich points out of their $\mathcal{N}(N)$ intersection points is hence $\mathcal{N}(N)$ (a linear scan on all the points). For L tiles, there are $\mathcal{N}(L^2)$ pairs. Therefore, the total time to get all the sandwich points given the intersection pairs takes:

$$\mathcal{N}(L^2 N).$$ Equation 21:

C) Given the sandwich points for pairwise tiles, finding the maximally overlapping set: Sorting the $\mathcal{N}(L^2)$ sandwich points takes $\mathcal{N}(L^2 \log L)$ time. Given $\mathcal{N}(L^2)$ sorted sandwich points, and examining each one by manipulating the overlap list takes $\mathcal{N}(\log L)$ time, the search of maximally overlapping tiles takes $\mathcal{N}(L^2 \log L)$ time (using a balanced tree structure in the overlap list). Therefore, the total running time of sorting the sandwich points and finding the maximally overlapping set is:

$$\mathcal{N}(L^2 \log L).$$ Equation 22:

Summing Equations 20-22 the total complexity of overlap detection is hence:

$$\mathcal{N}(LN \log(LN) + L^2 N + L^2 \log L).$$ Equation 23:

The target mobile device can be within the junction area of the maximally overlapping set of tiles. Its location is estimated as the point within the area where its measured signal best matches with the AP signal environment. To find the location whose AP signals best match with the target's, signal noise is considered when comparing the AP signals. The signal strength $\psi_n^l$ at RP n for AP l has expected value $\overline{\psi}_n^l$ and standard deviation $\sigma_n^l$, respectively (Equations (8) and (9)). For AP l common to both p (target vector) and $q_n$ (fingerprint vector at RP n), i.e., $\phi^l \neq 0$ and $\psi_n^l \neq 0$, the expected signal difference between them, denoted as $\Gamma^l(p, q_n)$, is then:

$$\Gamma^l(p, q_n) \triangleq E\left((f^l - y_n^l)^2\right)$$

$$= E\left((\phi^l)^2 - 2\phi^l \cdot \psi_n^l + (\psi_n^l)^2\right)$$

$$= E\left((\phi^l)^2\right) - 2E(\phi^l)\overline{\psi}_n^l + E\left((\psi_n^l)^2\right)$$

$$= (\phi^l)^2 + (\sigma^l)^2 + 2\phi^l \overline{\psi}_n^l + (\overline{\psi}_n^l)^2 + (\sigma_n^l)^2$$

$$= (\phi^l - \hat{\mu}_n^l)^2 + (\sigma^l)^2 + (\sigma_n^l)^2,$$

Equation 24

Using mean square value for signal difference follows the spirit of mean square error and can assign greater costs to RPs with large signal difference in signal space, which helps differentiating the RPs. By definition, if either $\phi^l = 0$ or $\psi_n^l = 0$ (or both), $\Gamma^l(p, q_n) = 0$ (i.e., only the common APs of two vectors are compared).

The difference metric to compare random signals is the overall expected signal difference (ESD) between the fingerprint at RP n and the target, given by:

$$\Gamma(p, q_n) = \frac{1}{J_n}\sum_{l=1}^{L}\Gamma^l(p, q_n), \quad \text{Equation 25}$$

where $J_n$ is the number of APs common to the target and RP n ($0 < J_n \le L$). If $J_n = 0$ (no shared APs between the target and RP n), by definition $\Gamma(p,q_n) = \infty$, i.e., RP n is essentially excluded from the optimization formulation in Equation 31.

The localization problem can be formulated using the difference metric given in Equation 25. Let $r_n = [x_n, y_n]$ be the coordinate of RP n. Let C be the set of the RP coordinates, i.e.:

$$C = \{r_n | n \in \{1, \ldots, N\}\}. \quad \text{Equation 26}$$

Let $\omega_n$ be the weight assigned to $r_n$ in locating target. As the target is bounded by the RPs, its estimated position can be expressed as:

$$\hat{x} = \sum_{n=1}^{N}\omega_n r_n, \quad \text{Equation 27}$$

where $r_n \in C$, and the weights satisfy:

$$\sum_{n=1}^{N}\omega_n = 1, \quad \text{Equation 28}$$

And:

$$\omega_n \ge 0, \forall n \in \{1, \ldots, N\}. \quad \text{Equation 29}$$

Besides at the tile junction (Constraint (18)), the target location can also be constrained by the allowed area in the map (the user accessible area such as the corridors between offices or the atrium in a building). Denote the boundaries of the above allowable area of target location as a set of linear constraints denoted as $B^v$. The target location can satisfy $$a_e^v \hat{x} + b_e^v \hat{y} + c_e^v \le 0, e \in B^v. \quad \text{Equation 30}$$

And therefore the localization problem can therefore be formulated as a linear programming:

$$\operatorname*{argmin}_{\{\omega_n\}}\sum_{n=1}^{N}\omega_n \Gamma(p, q_n), \quad \text{Equation 31}$$

subject to Constraints (), (), (), () and ().

In other words, the location with the best match between the target vector and the RP fingerprints is sought using the difference metric for random signals, by constraining the target location within the tile junction and allowable area. The solution is the set of weights assigned to each RP which minimizes the signal difference, i.e., the RPs with fingerprint similar to the target vector are assigned higher weights, and vice versa.

As there are $\mathcal{N}$ (L) maximally overlapping tiles, there are a total of $\mathcal{N}$ (NL) edges (line segments). There are $\mathcal{N}$ ($|B^v|$) edges (line segments) in map constraints. Therefore, totally there are $\mathcal{N}$ (NL+$|B^v|$) linear constraints. From Equation (29), there are $\mathcal{N}$ (N) decision variables, $\{\omega_n\}$, in the LP. Given the above, the complexity of solving the LP formulation in Equation (31) is given by:

$$\mathcal{N} (N^2(NL+|B^v|)). \quad \text{Equation 32:}$$

The LP can be solved by some commercial solver. Summing Equations (19), (23), and (32), the overall online complexity is $$\mathcal{N} (LN \log(LN) + L^2N + L^2 \log L + N^2(NL + |B^\Gamma|)),$$

The complexity of the disclosed localization system depends on the number of APs L and the number of RPs N. To reduce the complexity, the APs can be reduced by using only those which show substantial signal differentiation in the site. To this end, an information-theoretic metric can be employed to screen the APs by offline pre-processing. To reduce N, the RPs can be preprocessed using spectral clustering to partition the site into smaller regions, each of which with some exemplars. During the online stage, the target vector can be mapped to the cluster which has the most similar exemplars. This effectively reduces the search space to a small region.

In the survey site, some APs may show large signal range. These APs can generate tighter tiles of smaller area. To achieve computational efficiency, by means of the information-theoretic entropy measure the disclosed localization system can filter away those APs of small signal range. The basic idea is as follow. First the signal range of each AP in the site can be discretized. For an AP l, let $\min_n \hat{\mu}_n^l$ and $\max_n \hat{\mu}_n^l$ be its minimum and maximum fingerprint value among all the RPs, respectively. Given a certain signal discretization step w, the number of levels $M^l$ for the AP is hence given by:

$$M^l = \left\lceil \frac{\max_n \hat{\mu}_n^l - \min_n \hat{\mu}_n^l}{w} \right\rceil. \quad \text{Equation 33}$$

The fingerprint signal $\hat{\mu}_j^l$ is of level i, where $i \in \{1, \ldots, M^l\}$, iff:

$$\min_n \hat{\mu}_n^l + (i-1)w \le \hat{\mu}_j^l < \min_n \hat{\mu}_n^l + iw. \quad \text{Equation 34}$$

To calculate the entropy of an AP, the number of RPs can be counted for each signal level of the AP. Let $N_i^l$ be the number of RPs corresponding to level i of AP l. Recalling that $|N^l|$ is the number of RPs that can detect AP l, the fraction of RPs of level i, $P_i$, is:

$$P_i = \frac{N_i^l}{|N^l|}. \quad \text{Equation 35}$$

The entropy of AP l is given by:

$$H_l = -\sum_{i=1}^{M^l} P_i \log_2 P_i. \quad \text{Equation 36}$$

Figure 24:
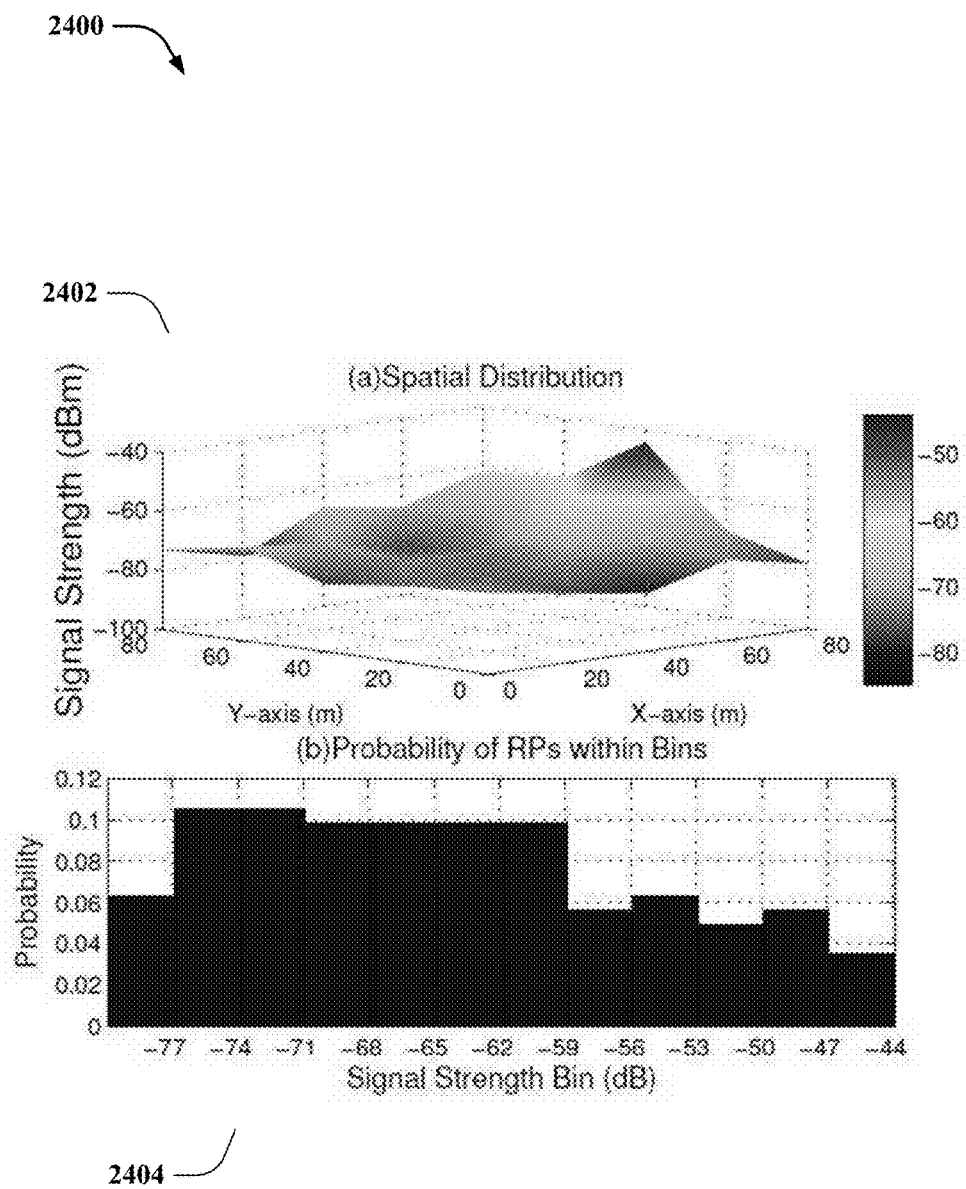
FIG. 24 depicts exemplary, non-limiting graphs showing typical signal distribution of Wi-Fi AP with high entropy and RP distribution of the AP within different signal strength levels according to an aspect or embodiment of the subject disclosure.

High entropy means that the AP has large signal range with rather uniform or similar number of RPs in each signal level. In FIG. 24 graph 2402 shows the typical signal pattern for a Wi-Fi AP with a high entropy. As shown in graph 2404 in FIG. 24, its RP distribution within each signal level is rather uniform. Thus, using this AP, distinct tiles can be generated depending on target signal. To reduce the number of APs (and hence speed up our LP solution), those APs with low entropy can be filtered out, keeping only the top ones. In this way, the number of APs in the site would be greatly reduced to only the top ones. The entropy calculation of all the APs takes $\mathcal{N}$ (NL). Sorting the corresponding entropy takes $\mathcal{N}$ (L log L). Therefore its total complexity is $\mathcal{N}$ (NL).

In order to efficiently solve the LP problem, the whole survey site is partitioned into smaller regions within which the fingerprints are similar. This is done through spectral clustering, which converges to the correct solution faster than K-mean clustering. By confining the search within a cluster, fewer RPs can be examined in LP (i.e., N in Equation 27 reduces to the size of cluster), thereof greatly speeding up the computation process.

The clustering process is as follows. Out of all the N RPs, the pairwise similarity of their fingerprints is calculated using Cosine similarity [20]. The similarity between two fingerprints $q_i$ and $q_j$ is given by:

$$\text{sim}(q_i, q_j) \triangleq \frac{q_i \cdot q_j}{\|q_i\|\|q_j\|} \quad \text{Equation 37}$$

$$= \frac{\sum_{l=1}^{L} \bar{\psi}_i^l \bar{\psi}_j^l}{\sqrt{\sum_{l=1}^{L} (\bar{\psi}_i^l)^2} \sqrt{\sum_{l=1}^{L} (\bar{\psi}_j^l)^2}}.$$

If there is no common AP between RP i and j (i.e., $\bar{\psi}_i^l \bar{\psi}_j^l = 0, \forall l$), the similarity is defined to be 0. Let $C_m$ be the set of RPs in cluster m. The RPs are grouped into K clusters so as to maximize the similarity of RSSI vectors within the clusters, i.e.:

$$\max_{\{C_m\}} \sum_{m=1}^{K} \sum_{j \in C_m} \text{sim}(q_j, r_m), \quad \text{Equation 38}$$

where $r_m$ is the mean of RSSI vectors within the cluster m:

$$r_m = \frac{\sum_{j \in C_m} q_j}{|C_m|}. \quad \text{Equation 39}$$

The RP clustering algorithm 2500 using spectral clustering is shown in FIG. 25. The similarity between different RPs is calculated first (Lines 1 to 6). Based on the pairwise similarity matrix S (formed by elements $S_{ij} \triangleq \text{sim}(q_i, q_j)$), a symmetric matrix Diag is constructed where each diagonal element represents the sum of each column in S (Line 7). Then eigenvalue decomposition is conducted over the difference between S and Diag (Lines 8 to 9). Then, in Line 10, the K-means algorithm is conducted over the obtained eigenvectors with the given number of clusters.

To efficiently identify which cluster the target belongs to, some exemplars within each cluster are elected as representatives for cluster comparison. These exemplars are the top few fingerprints which exhibit the highest similarity with all the other members in the cluster. Mathematically, for cluster m and for each $j \in C_m$, $\sum_{s \in C_m, s \neq j} \text{sim}(q_j, q_s)$. Out of all the $|C_m|$ computed values, the top ones are chosen as the exemplars for cluster m.

Given L APs after filtering, the complexity of constructing the similarity matrix out of N RPs (i.e., all the $\text{sim}(q_i, q_j)$) is $\mathcal{N}$ (N²L). The eigenvalue decomposition takes $\mathcal{N}$ (N³) and finding the top K eigenvectors takes $\mathcal{N}$ (N log N). The complexity of K-means clustering is $\mathcal{N}$ (NK²)× number of K-means iterations. Summing them up, and noting K<<N, the total complexity is hence $\mathcal{N}$ (N³+N²L).

Given the exemplars of each RP cluster, the online target RSSI vector is mapped to a corresponding RP cluster. Denote the set of exemplars of cluster m as $Q_m$. The target vector is compared with each exemplar signal vector using Cosine similarity, and map the target to the cluster which has the highest overall similarity, i.e.:

$$\underset{C_m}{\text{argmax}} \sum_{j \in Q_m} \text{sim}(p, q_j). \quad \text{Equation 40}$$

After a cluster is mapped, the RPs of the other clusters are filtered out and use only the RPs in the cluster region for localization. This greatly reduces N in the LP computation.

As for the complexity reduction after applying the AP filtering and RP clustering, let A≥1 be reduction factor for the APs, given by the ratio between the original number of APs and the resultant number of APs after filtering. Similarly, let $R=N/|C_m|\geq 1$ be reduction factor for the RPs. The speedup factors due to the AP reduction (by AP filtering) and RP reduction (by clustering) in each online localization component is shown in Table 3 below. It is clear that the speedup can be very substantial.

TABLE 3

| Computation Step | Complexity | Speedup Factor |
|---|---|---|
| Tile construction & intersection points | $\mathcal{O}(LN\log(LN))$ | RA |
| Finding sandwich points | $\mathcal{O}(L^2N)$ | RA² |
| Maximally overlapping set | $\mathcal{O}(L^2\log L)$ | A² |
| Linear Programming | $\mathcal{O}(N^2(NL + |B^v|))$ | R³A |

Figure 26:
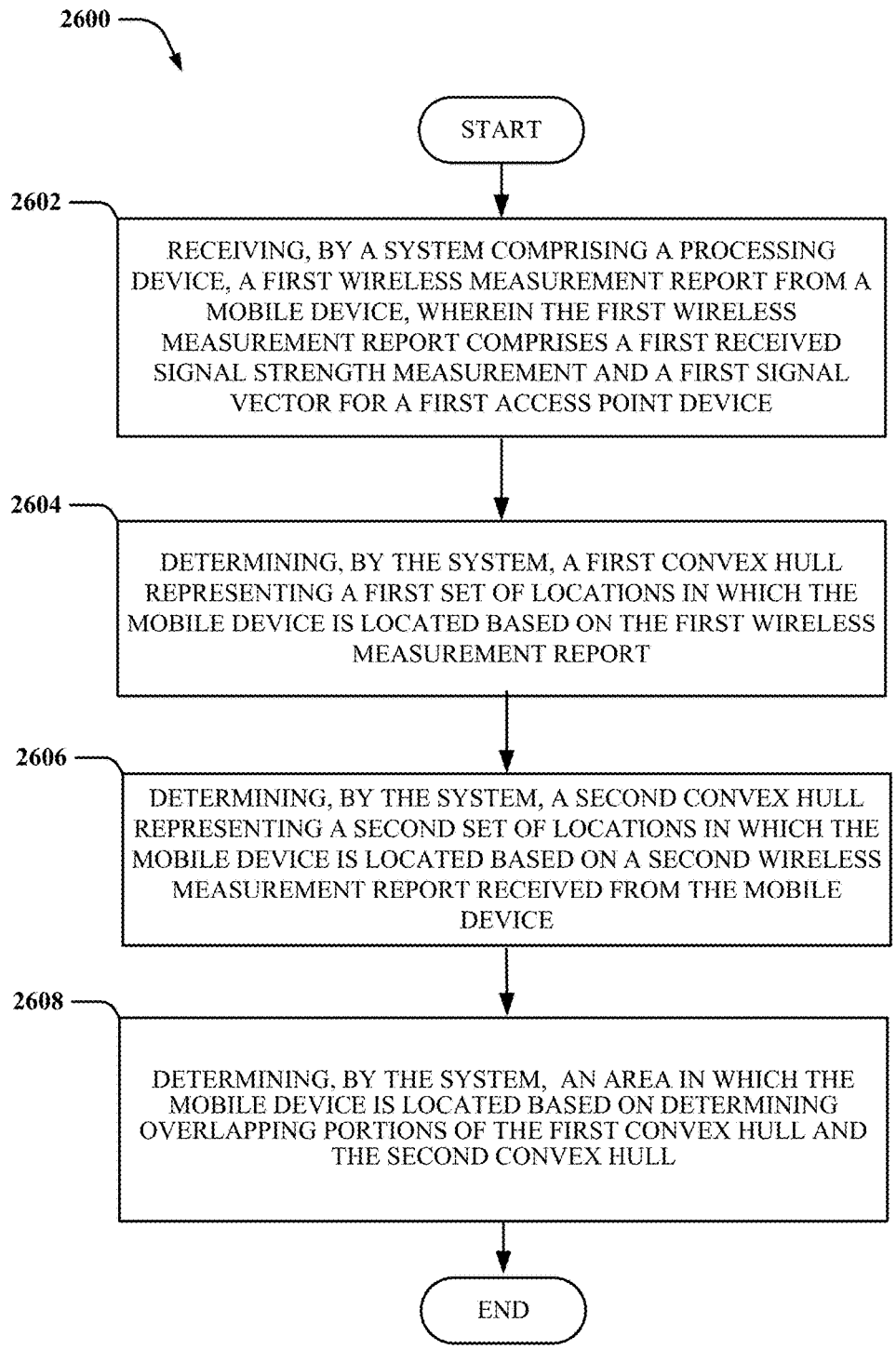
FIG. 26 is an example non-limiting process flow diagram of a method that determines a location based on overlapping convex hulls, according to an aspect or embodiment of the subject disclosure.

FIG. 26 is an example non-limiting process flow diagram of a method 2600 that determines a location based on overlapping convex hulls, according to an aspect or embodiment of the subject disclosure. For simplicity of explanation, the methods (or procedures) are depicted and described as a series of acts. It is noted that the various embodiments are not limited by the acts illustrated and/or by the order of acts. For example, acts can occur in various orders and/or concurrently, and with other acts not presented or described herein. In another aspect, the various acts can be performed by systems and/or components of embodiments described herein.

Method 2600 can begin at 2602, where the method includes receiving, by a system comprising a processing device, a first wireless measurement report from a mobile device, wherein the first wireless measurement report comprises a first received signal strength measurement and a first signal vector for a first access point device. At step 2604, the method can include determining, by the system, a first convex hull representing a first set of locations in which the mobile device is located based on the first wireless measurement report.

At 2606, the method can include determining, by the system, a second convex hull representing a second set of locations in which the mobile device is located based on a second wireless measurement report received from the mobile device.

At 2608, the method can include determining, by the system, an area in which the mobile device is located based on determining overlapping portions of the first convex hull and the second convex hull.

Figure 27:
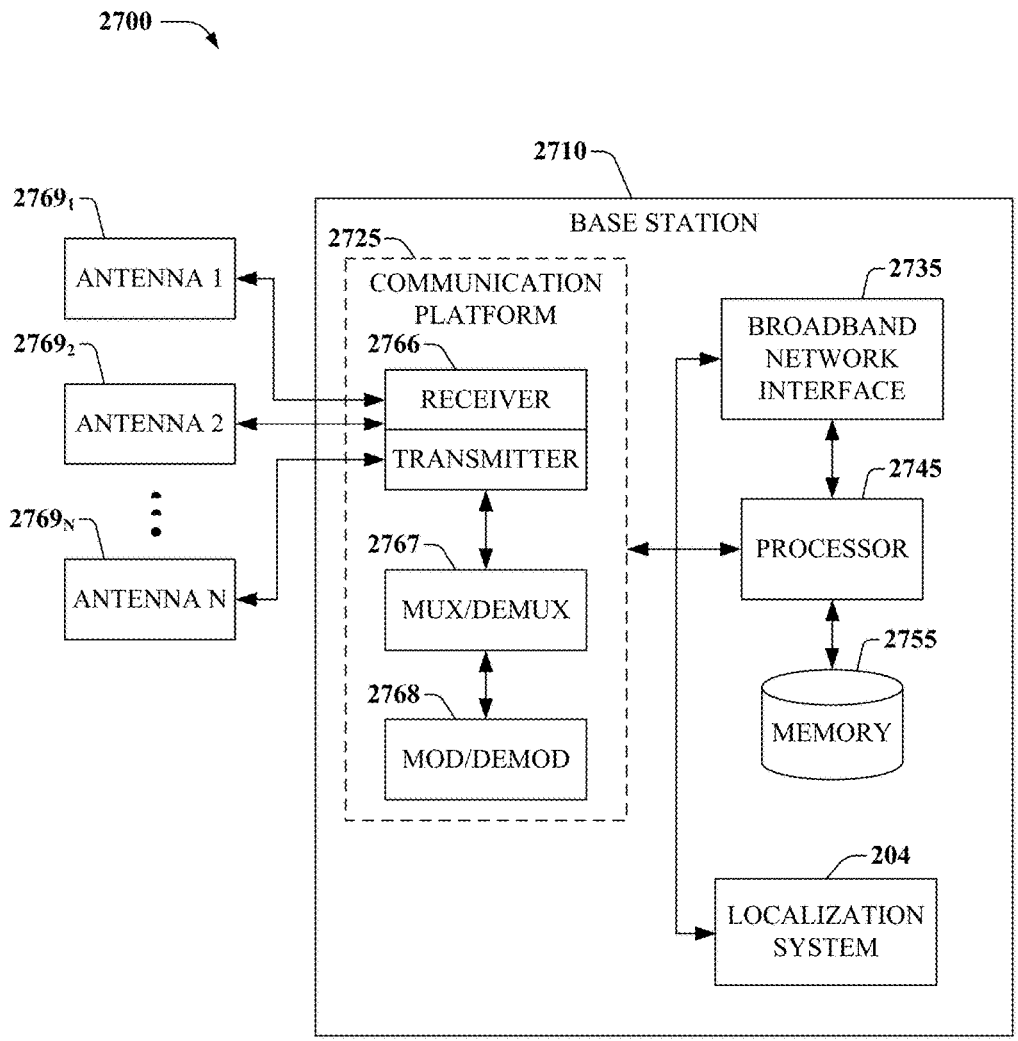
FIG. 27 illustrates an example embodiment of a base station that can cooperatively cache items to facilitate cooperative physical layer caching and transmissions, according to the subject disclosure.

With respect to FIG. 27, in example embodiment 2700, base station 2710 can receive and transmit signal(s) (e.g., traffic and control signals) from and to wireless devices, access terminals, wireless ports and routers, etc., through a set of antennas $2769_1$-$2769_N$. It should be appreciated that while antennas $2769_1$-$2769_N$ are a part of communication platform 2725, which comprises electronic components and associated circuitry that provides for processing and manipulating of received signal(s) (e.g., a packet flow) and signal(s) (e.g., a broadcast control channel) to be transmitted. In an aspect, communication platform 2725 can include a transmitter/receiver (e.g., a transceiver) 2766 that can convert signal(s) from analog format to digital format (e.g., analog-to-digital conversion) upon reception, and from digital format to analog (e.g., digital-to-analog conversion) format upon transmission. In addition, receiver/transmitter 2766 can divide a single data stream into multiple, parallel data streams, or perform the reciprocal operation. Coupled to transceiver 2766 is a multiplexer/demultiplexer 2767 that facilitates manipulation of signal in time and/or frequency space. Electronic component 2767 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM), etc. In addition, mux/demux component 2767 can scramble and spread information (e.g., codes) according to substantially any code known in the art; e.g., Hadamard-Walsh codes, Baker codes, Kasami codes, polyphase codes, and so on. A modulator/demodulator 2768 is also a part of operational group 2725, and can modulate information according to multiple modulation techniques, such as frequency modulation, amplitude modulation (e.g., M-ary quadrature amplitude modulation (QAM), with M a positive integer), phase-shift keying (PSK), and the like.

Base station 2710 also includes a processor 2745 configured to confer functionality, at least partially, to substantially any electronic component in the base station 2710, in accordance with aspects of the subject disclosure. In particular, processor 2745 can facilitate base station 2710 to implement configuration instructions received through communication platform 2725, which can include storing data in memory 2755. In addition, processor 2745 facilitates base station 2710 to process data (e.g., symbols, bits, or chips, etc.) for multiplexing/demultiplexing, such as effecting direct and inverse fast Fourier transforms, selection of modulation rates, selection of data packet formats, inter-packet times, etc. Moreover, processor 2745 can manipulate antennas $2769_1$-$2769_N$ to facilitate beamforming or selective radiation pattern formation, which can benefit specific locations (e.g., basement, home office . . . ) covered by base station; and exploit substantially any other advantages associated with smart-antenna technology. Memory 2755 can store data structures, code instructions, system or device information like device identification codes (e.g., MEI, MSISDN, serial number . . . ) and specification such as multimode capabilities; code sequences for scrambling; spreading and pilot transmission, floor plan configuration, access point deployment and frequency plans; and so on. Moreover, memory 2755 can store configuration information such as schedules and policies; base station address(es) or geographical indicator(s); access lists (e.g., white lists); license(s) for utilization of add-features for base station 2710, and so forth. In one example, cache component 816 can be implemented in memory 2755.

In embodiment 2700, processor 2745 can be coupled to the memory 2755 in order to store and retrieve information necessary to operate and/or confer functionality to communication platform 2725, broadband network interface 2735 (e.g., a broadband modem), and other operational components (e.g., multimode chipset(s), power supply sources . . . ; not shown) that support base station 1010. The base station 2710 can further include localization system 204, which can include functionality, as more fully described herein, for example, with regard to system 200. In addition, it is to be noted that the various aspects disclosed in the subject specification can also be implemented through (i) program modules stored in a computer-readable storage medium or memory (e.g., memory 2755) and executed by a processor (e.g., processor 2745), or (ii) other combination(s) of hardware and software, or hardware and firmware.

Figure 28:
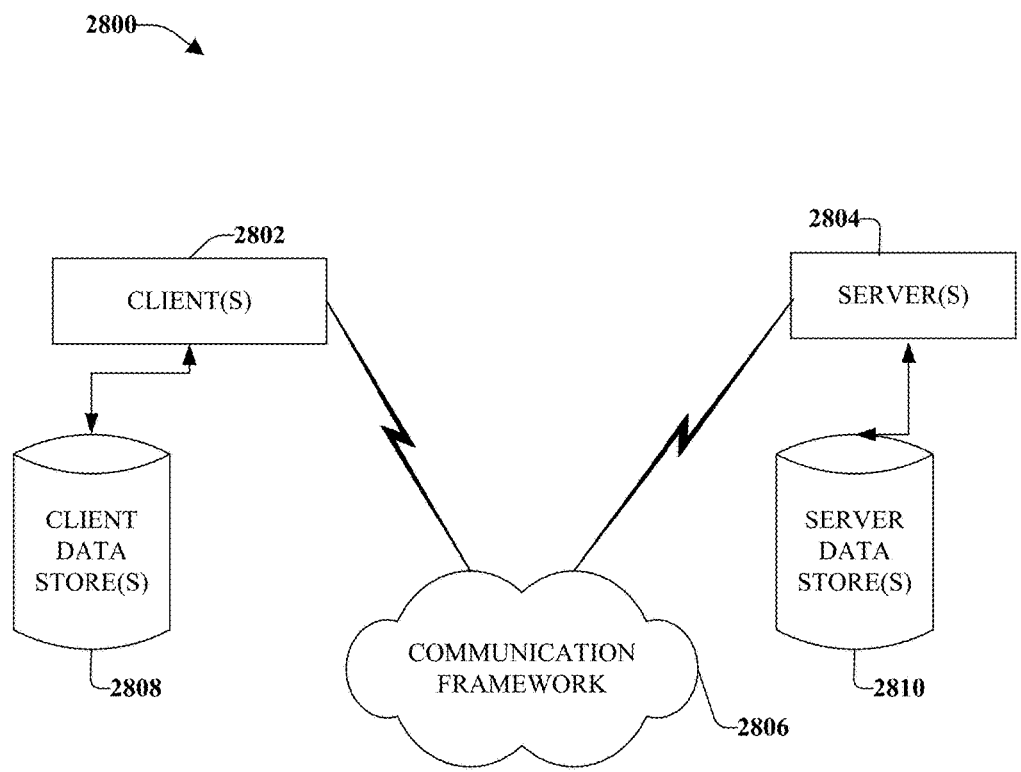
FIG. 28 illustrates an example schematic block diagram of a computing environment in accordance various aspects of this disclosure.

Referring now to FIG. 28, there is illustrated a schematic block diagram of a computing environment 2800 in accordance with this specification. The system 2800 includes one or more client(s) 2802, (e.g., computers, smart phones, tablets, cameras, PDA's). The client(s) 2802 can be hardware and/or software (e.g., threads, processes, computing devices). The client(s) 2802 can house cookie(s) and/or associated contextual information by employing the specification, for example.

The system 2800 also includes one or more server(s) 2804. The server(s) 2804 can also be hardware or hardware in combination with software (e.g., threads, processes, computing devices). The servers 2804 can house threads to perform transformations by employing aspects of this disclosure, for example. One possible communication between a client 2802 and a server 2804 can be in the form of a data packet adapted to be transmitted between two or more computer processes wherein data packets may include coded items. The data packet can include a cookie and/or associated contextual information, for example. The system 2800 includes a communication framework 2806 (e.g., a global communication network such as the Internet) that can be employed to facilitate communications between the client(s) 2802 and the server(s) 2804.

Communications can be facilitated via a wired (including optical fiber) and/or wireless technology. In an aspect, communications between client(s) 2802 and network devices (e.g., server(s) 2804) are through wireless channels. In another aspect, communication links between network devices (e.g., servers(s) 2804) can be via wireless and/or wired channels. It is noted that wireless connections between client(s) 2802 and network devices (e.g., server(s) 2804) are described herein, however client(s) 2802 may have other capabilities (e.g., wired communications capabilities). The client(s) 2802 are operatively connected to one or more client data store(s) 2808 that can be employed to store information local to the client(s) 2802 (e.g., cookie(s) and/or associated contextual information). Similarly, the server(s) 2804 are operatively connected to one or more server data store(s) 2810 that can be employed to store information local to the servers 2804.

In one implementation, a server 2804 can transfer an encoded file, (e.g., network selection policy, network condition information, etc.), to client 2802. Client 2802 can store the file, decode the file, or transmit the file to another client 2802. It is noted, that a server 2804 can also transfer uncompressed file to a client 2802 and client 2802 can compress the file in accordance with the disclosed subject matter. Likewise, server 2804 can encode information and transmit the information via communication framework 2806 to one or more clients 2802.

Figure 29:
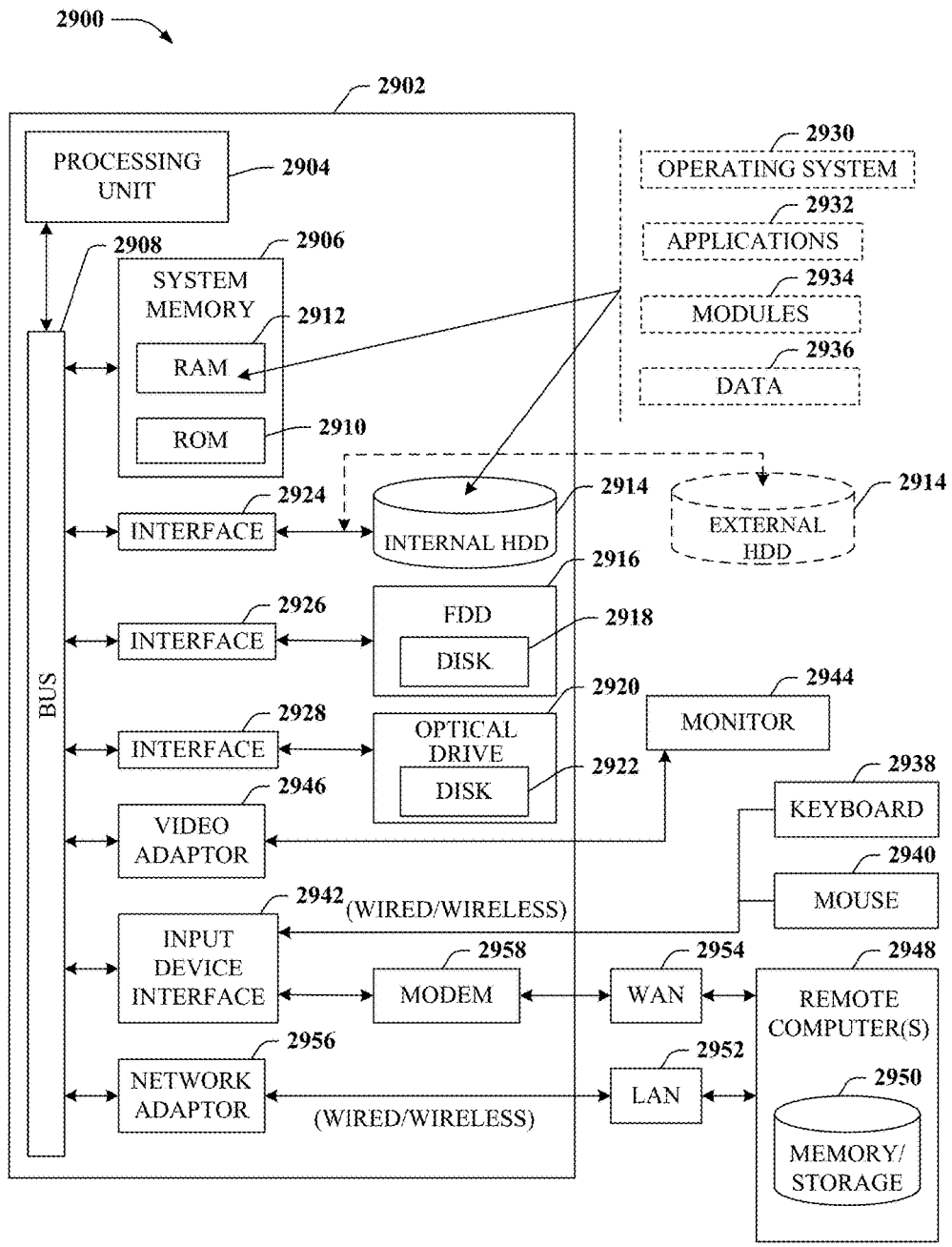
FIG. 29 illustrates a block diagram of a computer operable to execute the disclosed communication architecture.

Referring now to FIG. 29, there is illustrated a block diagram of a computer operable to execute the disclosed communication architecture. In order to provide additional context for various aspects of the subject specification, FIG. 29 and the following discussion are intended to provide a brief, general description of a suitable computing environment 2900 in which the various aspects of the specification can be implemented. While the specification has been described above in the general context of computer-executable instructions that can run on one or more computers, it is noted that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments, including cloud-computing environments, where certain tasks are performed by remote processing devices that are linked through a communications network. In a distributed computing environment, program modules can be located in both local and remote memory storage devices.

Computing devices can include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically include (and/or facilitate the transmission of) computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media.

With reference again to FIG. 29, the example environment 2900 for implementing various aspects of the specification includes a computer 2902, the computer 2902 including a processing unit 2904, a system memory 2906 and a system bus 2908. The system bus 2908 couples system components including, but not limited to, the system memory 2906 to the processing unit 2904. The processing unit 2904 can be any of various commercially available processors. Dual microprocessors and other multi-processor architectures can also be employed as the processing unit 2904.

The system bus 2908 can be any of several types of bus structure that can further interconnect to a memory bus (with or without a memory controller), a peripheral bus, and a local bus using any of a variety of commercially available bus architectures. The system memory 2906 includes read-only memory (ROM) 2910 and random access memory (RAM) 2912. A basic input/output system is stored in a non-volatile memory 2910 such as ROM, erasable programmable read only memory, electrically erasable programmable read only memory, which basic input/output system contains the basic routines that help to transfer information between elements within the computer 2902, such as during startup. The RAM 2912 can also include a high-speed RAM such as static RAM for caching data.

The computer 2902 further includes an internal hard disk drive 2914 (e.g., EIDE, SATA), which internal hard disk drive 2914 can also be configured for external use in a suitable chassis (not shown), a magnetic floppy disk drive 2916, (e.g., to read from or write to a removable diskette 2918) and an optical disk drive 2920, (e.g., reading a CD-ROM disk 2922 or, to read from or write to other high capacity optical media such as the DVD). The hard disk drive 2914, magnetic disk drive 2916 and optical disk drive 2920 can be connected to the system bus 2908 by a hard disk drive interface 2924, a magnetic disk drive interface 2926 and an optical drive interface 2928, respectively. The interface 2924 for external drive implementations includes at least one or both of Universal Serial Bus (USB) and IEEE 1394 interface technologies. Other external drive connection technologies are within contemplation of the subject specification.

The drives and their associated computer-readable storage media provide nonvolatile storage of data, data structures, computer-executable instructions, and so forth. For the computer 2902, the drives and storage media accommodate the storage of any data in a suitable digital format. Although the description of computer-readable storage media above refers to a HDD, a removable magnetic diskette, and a removable optical media such as a CD or DVD, it should be noted by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 2912, including an operating system 2930, one or more application programs 2932, other program modules 2934 and program data 2936. All or portions of the operating system, applications, modules, and/or data can also be cached in the RAM 2912. It is noted that the specification can be implemented with various commercially available operating systems or combinations of operating systems.

A user can enter commands and information into the computer 2902 through one or more wired/wireless input devices, e.g., a keyboard 2938 and a pointing device, such as a mouse 2940. Other input devices (not shown) can include a microphone, an IR remote control, a joystick, a game pad, a stylus pen, touch screen, or the like. These and other input devices are often connected to the processing unit 2904 through an input device interface 2942 that is coupled to the system bus 2908, but can be connected by other interfaces, such as a parallel port, an IEEE 1394 serial port, a game port, a USB port, an IR interface, etc.

A monitor 2944 or other type of display device is also connected to the system bus 2908 via an interface, such as a video adapter 2946. In addition to the monitor 2944, a computer typically includes other peripheral output devices (not shown), such as speakers, printers, etc.

The computer 2902 can operate in a networked environment using logical connections via wired and/or wireless communications to one or more remote computers, such as a remote computer(s) 2948. The remote computer(s) 2948 can be a workstation, a server computer, a router, a personal computer, portable computer, microprocessor-based entertainment appliance, a peer device or other common network node, and typically includes many or all of the elements described relative to the computer 2902, although, for purposes of brevity, only a memory/storage device 2950 is illustrated. The logical connections depicted include wired/wireless connectivity to a local area network 2952 and/or larger networks, e.g., a wide area network 2954. Such local area network and wide area network networking environments are commonplace in offices and companies, and facilitate enterprise-wide computer networks, such as intranets, all of which can connect to a global communications network, e.g., the Internet.

When used in a local area network networking environment, the computer 2902 is connected to the local network 2952 through a wired and/or wireless communication network interface or adapter 2956. The adapter 2956 can facilitate wired or wireless communication to the local area network 2952, which can also include a wireless access point disposed thereon for communicating with the wireless adapter 2956.

When used in a wide area network environment, the computer 2902 can include a modem 2958, or is connected to a communications server on the wide area network 2954, or has other means for establishing communications over the wide area network 1354, such as by way of the Internet. The modem 2958, which can be internal or external and a wired or wireless device, is connected to the system bus 2908 via the serial port interface 2942. In a networked environment, program modules depicted relative to the computer 2902, or portions thereof, can be stored in the remote memory/storage device 2950. It is noted that the network connections shown are example and other means of establishing a communications link between the computers can be used.

The computer 2902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. In an example embodiment, wireless communications can be facilitated, for example, using Wi-Fi, Bluetooth™, Zigbee, and other 802.XX wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks can operate in the unlicensed 2.4 and 5 GHz radio bands, at an 12 Mbps (802.11a), 54 Mbps (802.11b), or 150 Mbps (802.11n) data rate, for example, or with products that contain both bands (dual band), so the networks can provide real-world performance similar to wired Ethernet networks used in many homes and/or offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. It is noted that the memory components, or computer-readable storage media, described herein can be either volatile memory(s) or nonvolatile memory(s), or can include both volatile and nonvolatile memory(s).

By way of illustration, and not limitation, nonvolatile memory(s) can include read only memory (ROM), programmable ROM (PROM), electrically programmable ROM (EPROM), electrically erasable ROM (EEPROM), or flash memory. Volatile memory(s) can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "module," "system," "interface," "platform," "service," "framework," "connector," "controller," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
      receiving a first wireless signal report from a mobile device, wherein the first wireless signal report comprises a first received signal strength indication for a first access point;
      determining a first tile in which the mobile device is located, wherein the first tile is a convex hull representing a set of candidate locations at which the first received signal strength indication is within a predetermined variance from a target measurement associated with the first access point;
      determining a second tile in which the mobile device is located based on a second wireless signal report comprising a second received signal strength indication from a second access point; and
      determining an area in which the mobile device is located, wherein the area is an overlapping area between the first tile and the second tile.

2. The system of claim 1, wherein the operations further comprise:
   determining a set of tiles in which the mobile device is located, wherein the area in which the mobile device is located in is the area where a highest number of tiles of the set of tiles overlap.

3. The system of claim 1, wherein the first received signal strength indication is a function of a mean and a variance of signal strength of a received signal.

4. The system of claim 1, wherein the first access point and the second access point satisfy a predetermined condition with respect to signal dynamic range for signals received from the first access point and the second access point.

5. The system of claim 1, wherein the determining the first tile in which the mobile device is located is based on a location of the first access point.

6. The system of claim 1, wherein the operations further comprise:
   identifying the first access point by matching the first wireless signal report to a reference signal report associated with a reference location of a set of reference locations, and wherein the reference signal report corresponds to a virtual signal received at the reference location from the first access point.

7. The system of claim 6, wherein the set of reference locations form a boundary for the first tile and the second tile.

8. The system of claim 6, wherein the set of reference locations are related to each other based on signal vectors of a set of reference signal reports satisfying a predetermined similarity condition.

9. The system of claim 6, wherein the operations further comprise:
   determining that the set of reference locations are related to each other during an offline phase.

10. The system of claim 8, wherein the matching the first wireless signal report to the reference signal report further comprises identifying a first signal vector of the signal vectors of the set of reference signal reports that satisfies a second predetermined similarity condition with respect to a second signal vector of the first wireless signal.

11. A method, comprising:
    receiving, by a system comprising a processing device, a first wireless measurement report from a mobile device, wherein the first wireless measurement report comprises a first received signal strength measurement and a first signal vector for a first access point device;
    determining, by the system, a first convex hull representing a first set of locations at which the first received signal strength measurement is within a predetermined variance from a first target measurement associated with the first access point device;

determining, by the system, a second convex hull representing a second set of locations at which a second received signal strength measurement is within a predetermined variance from a second target measurement associated with a second access point device based on a second wireless measurement report received from the mobile device; and determining, by the system, an area in which the mobile device is located based on determining overlapping portions of the first convex hull and the second convex hull.

12. The method of claim 11, further comprising:

determining, by the system, a set of convex hulls in which the mobile device is potentially located; and determining, by the system, the area in which the mobile device is located based on identifying the area where a highest number of convex hulls of the set of convex hulls overlap.

13. The method of claim 11, wherein the first received signal strength measurement is a function of a mean or a variance of signal strength of a received signal.

14. The method of claim 11, further comprising:

determining, by the system, that signals associated with the first access point device and the second access point device satisfy a predetermined criterion with respect to dynamic range.

15. The method of claim 11, further comprising:

identifying, by the system, the first access point device by matching the first wireless measurement report to a reference signal report associated with a reference location of a set of reference locations, wherein the reference signal report corresponds to a virtual signal received at the reference location from the first access point device.

16. The method of claim 15, wherein the set of reference locations are related to each other based on signal vectors of a set of reference signal reports satisfying a predetermined condition with respect to similarity.

17. The method of claim 15, further comprising:

determining, by the system, that the set of reference locations are related to each other during an offline phase.

18. The method of claim 16, further comprising:

determining that a third signal vector of the signal vectors of the set of reference signal reports that satisfies a second predetermined condition with respect to similarity with respect to the first signal vector of the first wireless measurement report.

19. A non-transitory computer-readable storage device storing computer-executable instructions that, in response to execution, cause a system comprising a processor to perform operations, comprising:

receiving a first wireless measurement report from a mobile device, wherein the first wireless measurement report comprises a first received signal strength measurement and a first signal vector for a first access point device;

determining a first tile representing a first set of locations at which the first received signal strength measurement is within a predetermined variance from a first target measurement associated with the first access point device;

determining a second tile representing a second set of locations which a second received signal strength measurement is within a predetermined variance from a second target measurement associated with a second access point device based on a second wireless measurement report received from the mobile device, wherein the first tile and the second tile are convex hulls; and determining an area in which the mobile device is located based on determining overlapping portions of the first tile and the second tile.

20. The non-transitory computer-readable storage device of claim 19, wherein the operations further comprise:

determining that signals associated with the first access point device and the second access point device satisfy a predetermined criterion with respect to dynamic range.

* * * * *